United States Patent
Gao et al.

(10) Patent No.: US 11,394,518 B2
(45) Date of Patent: Jul. 19, 2022

(54) SYSTEM AND METHOD FOR FLEXIBLE CHANNEL STATE INFORMATION-REFERENCE SIGNAL TRANSMISSION

(71) Applicant: Telefonaktiebolaget LM Ericsson (publ), Stockholm (SE)

(72) Inventors: Shiwei Gao, Nepean (CA); Mattias Frenne, Uppsala (SE); Robert Mark Harrison, Grapevine, TX (US); Siva Muruganathan, Stittsville (CA)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/300,016

(22) PCT Filed: Apr. 3, 2017

(86) PCT No.: PCT/SE2017/050329
§ 371 (c)(1),
(2) Date: Nov. 8, 2018

(87) PCT Pub. No.: WO2017/171630
PCT Pub. Date: Oct. 5, 2017

(65) Prior Publication Data
US 2019/0149306 A1    May 16, 2019

Related U.S. Application Data

(60) Provisional application No. 62/316,984, filed on Apr. 1, 2016.

(51) Int. Cl.
*H04L 5/00* (2006.01)
*H04L 1/00* (2006.01)
(Continued)

(52) U.S. Cl.
CPC ......... *H04L 5/0057* (2013.01); *H04B 17/309* (2015.01); *H04L 1/0026* (2013.01);
(Continued)

(58) Field of Classification Search
CPC .... H04B 17/309; H04W 24/10; H04L 1/0026; H04L 5/0023; H04L 5/005; H04L 5/0057; H04L 5/0094
See application file for complete search history.

(56) References Cited

U.S. PATENT DOCUMENTS 8,442,569 B2 * 5/2013 Hoshino ............... H04L 5/0051
375/E7.141
2011/0170435 A1 * 7/2011 Kim ....................... H04L 5/0023
370/252
(Continued)

FOREIGN PATENT DOCUMENTS

CN    101924610 A    12/2010
CN    102263723 A    11/2011
(Continued)

OTHER PUBLICATIONS

International Search Report for International application No. PCT/SE2017/050329—dated Jun. 21, 2017.
(Continued)

*Primary Examiner* — Benjamin H Elliott, IV
(74) *Attorney, Agent, or Firm* — Baker Botts, LLP

(57) ABSTRACT

System and method for flexible channel state information-reference signal transmission A method by a wireless device is provided for restricting channel state information (CSI) measurement. The method includes receiving, from a network node, information identifying a first subset of channel state information-reference signal (CSI-RS) resources to be used in performing CSI measurements. The first subset of CSI-RS resources are associated with a first portion of a
(Continued)

frequency band that is less than all of the frequency band. CSI measurements are performed in the first subset of CSI-RS resources that are associated with the first portion of the frequency band.

16 Claims, 27 Drawing Sheets

(51) Int. Cl.
  *H04B 17/309* (2015.01)
  *H04W 24/10* (2009.01)
(52) U.S. Cl.
  CPC ............ *H04L 5/005* (2013.01); *H04L 5/0023* (2013.01); *H04L 5/0094* (2013.01); *H04W 24/10* (2013.01)

(56) References Cited

U.S. PATENT DOCUMENTS

| | | | | |
|---|---|---|---|---|
| 2012/0207199 | A1* | 8/2012 | Guo | H04L 1/0026 375/224 |
| 2013/0114441 | A1* | 5/2013 | Yoo | H04L 1/0026 370/252 |
| 2013/0244676 | A1* | 9/2013 | Koivisto | H04L 5/0048 455/452.1 |
| 2013/0250782 | A1* | 9/2013 | Nimbalker | H04L 1/0038 370/252 |
| 2015/0036609 | A1* | 2/2015 | Kim | H04W 56/00 370/329 |
| 2015/0215910 | A1* | 7/2015 | Han | H04W 56/0045 370/329 |
| 2015/0318972 | A1* | 11/2015 | Zhang | H04L 5/0057 370/329 |
| 2016/0112167 | A1* | 4/2016 | Xu | H04L 5/005 370/329 |
| 2016/0380734 | A1* | 12/2016 | Wang | H04L 5/0057 370/329 |
| 2017/0134134 | A1* | 5/2017 | Lee | H04B 7/0626 |
| 2018/0097596 | A1* | 4/2018 | Palanivelu | H04L 5/0005 |
| 2018/0102817 | A1* | 4/2018 | Park | H04B 7/04 |
| 2018/0294848 | A1* | 10/2018 | Park | H04L 5/0057 |
| 2018/0351617 | A1* | 12/2018 | Liu | H04B 7/0478 |
| 2019/0081676 | A1* | 3/2019 | Wei | H04B 7/063 |
| 2019/0149306 | A1* | 5/2019 | Gao | H04L 1/0026 |

FOREIGN PATENT DOCUMENTS

| | | |
|---|---|---|
| CN | 102792621 A | 11/2012 |
| CN | 105191164 A | 12/2015 |
| WO | 2011 087886 A1 | 7/2011 |
| WO | 2015 168925 A1 | 11/2015 |

OTHER PUBLICATIONS

Chinese Office Action issued for Application No. 201780034089.5—dated Apr. 6, 2021.
Chinese Search Report issued for Application No. 201780034089.5—dated Apr. 6, 2021.
Communication Pursuant To Article 94(3) EPC issued for Application No. 17 717 899.3-1205—dated Jan. 12, 2021.
Chinese Office Action, With Search Report, issued for Application No. 201780034089.5—dated Jan. 25, 2022.
3GPP TS 36.211 v13.0.0; Technical Specification; 3rd Generation Partnership Project; Technical Specification Group Radio Access Network; Evolved Universal Terrestrial Radio Access (E-UTRA); Physical channels and modulation (Release 13)—Dec. 2015.
3GPP TS 36.212 v13.0.0; Technical Specification; 3rd Generation Partnership Project; Technical Specification Group Radio Access Network; Evolved Universal Terrestrial Radio Access (E-UTRA); Multiplexing and channel coding (Release 13)—Dec. 2015.

* cited by examiner

SYSTEM AND METHOD FOR FLEXIBLE CHANNEL STATE INFORMATION-REFERENCE SIGNAL TRANSMISSION

PRIORITY

This nonprovisional application is a U.S. National Stage Filing under 35 U.S.C. § 371 of International Patent Application Serial No. PCT/SE2017/050329 filed Apr. 3, 2017, and entitled "System and Method for Flexible Channel State Information-Reference Signal Transmission" which claims priority to U.S. Provisional Patent Application No. 62/316,984 filed Apr. 1, 2016, both of which are hereby incorporated by reference in their entirety.

TECHNICAL FIELD

The present disclosure relates, in general, to wireless communications and, more particularly, system and method for flexible channel state information-reference signal (CSI-RS) transmission.

BACKGROUND

LTE uses Orthogonal Frequency Division Multiplexing (OFDM) in the downlink and Discrete Fourier Transform-spread (DFT-spread) OFDM in the uplink. FIG. 1 illustrates the basic LTE downlink physical resource can thus be seen as a time-frequency grid, where each resource element corresponds to one OFDM subcarrier during one OFDM symbol interval.

FIG. 2 illustrates LTE downlink transmissions in the time domain. The LTE downlink transmissions are organized into radio frames of 10 ms, each radio frame consisting of ten equally-sized subframes of length $T_{subframe}=1$ ms.

Furthermore, the resource allocation in LTE is typically described in terms of resource blocks (RBs), where a resource block corresponds to one slot (0.5 ms) in the time domain and twelve contiguous subcarriers in the frequency domain. Resource blocks are numbered in the frequency domain, starting with zero from one end of the system bandwidth.

FIG. 3 illustrates an example downlink subframe. Downlink transmissions are dynamically scheduled. In other words, in each subframe the base station transmits control information about to which terminals data is transmitted and upon which resource blocks the data is transmitted in the current downlink subframe. This control signaling is typically transmitted in the first 1, 2, 3 or 4 OFDM symbols in each subframe. For example, FIG. 3 illustrates a downlink system with 3 OFDM symbols as control.

In LTE, a number of physical downlink (DL) channels and transmission modes are supported. A downlink physical channel corresponds to a set of resource elements carrying information originating from higher layers. The following are some of the physical channels supported in LTE:
Physical Downlink Shared Channel (PDSCH)
Physical Downlink Control Channel (PDCCH)
Enhanced Physical Downlink Control Channel (EPDCCH)
Physical Uplink Shared Channel (PUSCH)
Physical Uplink Control Channel (PUCCH)
PDSCH is used mainly for carrying user traffic data and higher layer messages. PDSCH is transmitted in a DL subframe outside of the control region as shown in FIG. 3. Both PDCCH and EPDCCH are used to carry Downlink Control Information (DCI) such as physical resource block (PRB) allocation, modulation level and coding scheme (MCS), precoder used at the transmitter, and other information. PDCCH is transmitted in the first one to four OFDM symbols in a DL subframe, which is the control region, while EPDCCH is transmitted in the same region as PDSCH.

Different DCI formats are defined in LTE for DL and uplink (UL) data scheduling. For example, as provided in 3GPP TS 36.212, DCI formats 0 and 4 are used for UL data scheduling while DCI formats 1, 1A, 1B, 1C, 1D, 2, 2A, 2B, 2C, 2D, 3/3A are used for DL data scheduling. There are two search spaces defined for PDCCH, i.e. a common search space and a user equipment (UE) specific search space. The common search space consists of PDCCH resources over which all UEs monitor for PDCCH(es). A PDCCH intended for all or a group UEs is always transmitted in the common search space so all UE can receive it. UE specific search space consists of PDCCH resources that can vary from UE to UE. A UE monitors both the common search space and the UE specific search space associated with it for PDCCH(es). DCI 1C carries information for PDSCH intended for all UEs or for UEs that have not been assigned with a Radio Temporary Network Identifier (RNTI). Thus, DCI 1C is always transmitted in the common search space. DCI 0 and DCI 1A can be transmitted on either common or UE specific search space. DCI 1B, 1D, 2, 2A, 2C, and 2D are always transmitted on UE specific search space.

In DL, which DCI format is used for data scheduling is associated with a DL transmission scheme and/or the type of message to be transmitted. The following are some of the transmission schemes supported in LTE.
Single-antenna port
Transmit diversity (TxD)
Open-loop spatial multiplexing
Close-loop spatial multiplexing
Up to 8 layer transmission
PDCCH is always transmitted with either the single-antenna port or Transmit Diversity scheme while PDSCH can use any one of the transmission schemes. In LTE, a UE is configured with a transmission mode (TM), rather than a transmission scheme. There are 10 TMs, i.e. TM1 to TM10, defined so far for PDSCH in LTE. Each TM defines a primary transmission scheme and a backup transmission scheme. The backup transmission scheme is either single antenna port or TxD. The primary transmission schemes in LTE include:
TM1: single antenna port, port 0
TM2: TxD
TM3:open-loop SM
TM4:close-loop SM
TM9: up to 8 layer transmission, port 7-14
TM10: up to 8 layer transmission, port 7-14
In TM1 to TM6, cell specific reference signal (CRS) is used as the reference signal for both CSI feedback and for demodulation at a UE. While in TM7 to TM10, UE specific demodulation reference signal (DMRS) is used as the reference signal for demodulation.

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

A core component in LTE is the support of MIMO antenna deployments and MIMO related techniques. Currently, up to 8-layer spatial multiplexing in the downlink with 2, 4, 8, 16 transmit (Tx) antenna ports laid out in one dimension or 8, 12, and 16 transmit antenna ports laid out in two dimensions (2D) is supported in LTE with channel dependent precoding; The spatial multiplexing mode is aimed for high data rates in favorable channel conditions.

FIG. 4 illustrates an example spatial multiplexing operation. As depicted, the information carrying symbol vector, s, is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a precoder matrix indicator (PMI), which specifies a unique precoder matrix in the codebook for a given number of symbol streams. Symbol vector, s, is a r×1 vector with r data symbols each corresponding to a data layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

LTE uses OFDM in the downlink (and DFT precoded OFDM in the uplink) and hence the received $N_R \times 1$ ($N_R$ is number of receive antennas at a UE) vector $y_n$ for a certain TFRE on subcarrier n (or alternatively data TFRE number n) is thus modeled by $$y_n = H_n W s_n + e_n \qquad \text{Equation 1}$$

where $H_n$ is a $N_R \times N_T$ MIMO channel matrix, $s_n$ is a r×1 transmitted data symbol vector, and $e_n$ is a noise/interference vector. The precoder, w, can be a wideband precoder, which is constant over frequency, or frequency selective (i.e. it may be different from one RB to another).

The precoder matrix is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the UE. In addition, the precoder matrix may also be selected to strive for orthogonalizing the channel, meaning that after proper linear equalization at the UE, the inter-layer interference is reduced.

The transmission rank, and thus the number of spatially multiplexed layers, is reflected in the number of columns of the precoder. For efficient performance, it is important that a transmission rank that matches the channel properties is selected.

When all the data layers are transmitted to one UE, it is referred to as single user MIMO or SU-MIMO. On the other hand, when the data layers are transmitted to multiple UEs, it is referred to as multi-user MIMO or MU-MIMO. MU-MIMO is possible when, for example, two UEs are located in different areas of a cell such that they can be separated through different precoders (or beamforming) at the eNodeB (eNB) (a network node in LTE), the two UEs may be served on the same time-frequency resources (i.e. PRBs) by using different precoders or beams. In DMRS based transmission modes 9 and 10, different DMRS ports and/or the same DMRS port with different scrambling codes can be assigned to the different UEs for MU-MIMO transmission. In this case, MU-MIMO is transparent to UE. For example, a UE is not informed about the co-scheduling of another UE in the same PRBs.

MU-MIMO requires much more accurate downlink channel information than in SU-MIMO in order for the eNB to use precoding to separate the UEs, i.e. reducing cross interference to the co-scheduled UEs by forming nulls toward the co-scheduled UEs.

In closed loop MIMO transmission schemes such as TM9 and TM10, a UE estimates and feeds back the downlink CSI to the eNB. The eNB uses the feedback CSI to transmit downlink data to the UE. The CSI consists of a transmission rank indicator (RI), a precoding matrix indicator (PMI) and a channel quality indicator(s) (CQI). A codebook of precoding matrices is used by the UE to find out the best match between the estimated downlink channel $H_n$ and a precoding matrix in the codebook based on certain criteria, for example, maximizing the UE throughput. The channel $H_n$ is estimated based on a Non-Zero Power CSI reference signal (NZP CSI-RS) transmitted in the downlink for TM9 and TM10.

Together, the CQI, RI, and PMI provide the downlink channel state of the UE. This is also referred to as implicit CSI feedback since the estimation of $H_n$ is not fed back directly. The CQI/RI/PMI can be wideband or sub-band depending on which reporting mode is configured.

The RI corresponds to a recommended number of streams/layers that are to be spatially multiplexed and thus transmitted in parallel over the downlink channel. The PMI identifies a recommended precoding matrix codeword (in a codebook which contains precoders with the same number of rows as the number of CSI-RS ports) for the transmission, which relates to the spatial characteristics of the channel. The CQI represents a recommended transport block size such as, for example, code rate, and LTE supports transmission of one or two simultaneous (on different layers) transmissions of transport blocks (i.e. separately encoded blocks of information) to a UE in a subframe. There is thus a relation between a CQI and an SINR of the spatial stream(s) over which the transport block or blocks are transmitted.

Codebook of up to 16 antenna ports has been defined in LTE. Both one-dimension (1D) and two-dimension (2D) antenna array are supported. For LTE Rel-12 UE and earlier, only a codebook feedback for a 1D port layout is supported, with 2, 4 or 8 antenna ports. Hence, the codebook is designed assuming these ports are arranged on a straight line. In LTE Rel-13, codebooks for 2D port layouts were specified for the case of 8, 12, or 16 antenna ports. In addition, a codebook 1D port layout for the case of 16 antenna ports was also specified in LTE Rel-13.

In LTE Rel-13, two types of CSI reporting were introduced. Specifically, 3GPP 36.213 specifies Class A and Class B as the two types of CSI reporting. In Class A-CSI reporting, a UE measures and reports CSI based on a new codebook for the configured 2D antenna array with 8, 12 or 16 antenna ports. The CSI consists of a RI, a PMI and a CQI or CQIs.

In Class B-CSI reporting, in one scenario (also referred to as "K>1"), the eNB may pre-form multiple beams in one antenna dimension. There can be multiple ports (1, 2, 4, or 8 ports) within each beam on the other antenna dimension. "beamformed" CSI-RS are transmitted along each beam. A UE first selects the best beam from a group of beams configured and then measures CSI within the selected beam based on the legacy codebook for 2, 4, or 8 ports. The UE then reports back the selected beam index and the CSI corresponding to the selected beam. In another scenario (also referred to as "K=1"), the eNB may form up to 4 (2D) beams on each polarization and "beamformed" CSI-RS is transmitted along each beam. A UE measures CSI on the "beamformed" CSI-RS and feedback CSI based on a new Class B codebook for 2, 4, 8 ports.

In LTE, two types of CSI feedbacks are supported, i.e. period feedback and aperiodic feedback. In periodic CSI feedback, a UE is configured to report CSI periodically on certain preconfigured subframes, and the feedback information is carried on the UL PUCCH channel. In aperiodic CSI feedback, a UE only report CSI when it is requested. The request is signaled in a UL grant such as, for example, either in DCI 0 or DCI 4 carried on PDCCH or EPDCCH.

Channel State Information-Reference Signal (CSI-RS) was introduced in LTE for downlink CSI estimation in transmission modes 9 and 10. CSI reference signals can be transmitted on 2, 4, 8, 12, or 16 antenna ports (ports #15 to 30). The antenna ports will also be referred to as CSI-RS ports. FIG. 5 illustrates the resource elements (REs) available for CSI-RS allocations in a PRB. Up to 40 REs can be configured for CSI-RS.

For 2, 4, and 8 antenna ports, CSI-RS associated with each antenna port is allocated with two adjacent REs per PRB on the same subcarrrier and in two adjacent OFDM symbols. Two CSI-RS signals are multiplexed using two orthogonal cover codes (OCC) of length two, also referred to as OCC2. So for 2 antenna ports, there are 20 different patterns available within a subframe.

FIGS. 6A and 6B illustrate CSI-RS patterns or resource configurations for 4 and 8 antenna ports, respectively. REs shaded similarly form one CSI-RS resource configuration. As depicted, there are 10 and 5 CSI-RS resource patterns or resource configurations, respectively. For TDD, some additional CSI-RS patterns are available.

FIGS. 7A and 7B illustrate one example of a CSI-RS pattern or resource configuration for 12 and 16 antenna ports, respectively. For 12 antenna ports, a CSI-RS resource is obtained by aggregating three 4 ports CSI-RS resources, as shown in FIG. 7A. Similarly, for 16 antenna ports, a CSI RS resource is obtained by aggregating two 8 ports CSI-RS resources, as shown in FIG. 7B. With increased number of CSI-RS ports, the number of CSI-RS resource configurations is reduced. For example, for 12 CSI-RS ports, only three CSI-RS resource configurations are available in a subframe. For 16 CSI-RS ports, only two CSI-RS resource configurations are available.

The complex CSI reference-signal sequence is defined as $$r_{l,n_s}(m) = \frac{1}{\sqrt{2}}(1 - 2 \cdot c(2m)) + j\frac{1}{\sqrt{2}}(1 - 2 \cdot c(2m + 1)), \quad \text{Equation 2}$$

$$m = 0, 1, \ldots, N_{RB}^{max,DL} - 1$$

where $n_s$ is the slot number within a radio frame and l is the OFDM symbol number within the slot. c(i) is pseudo-random sequence initialized at the start of each OFDM symbol. Furthermore, $N_{RB}^{max,DL}$=110 i is the largest downlink bandwidth configuration supported by LTE. This sequence is mapped to each of the CSI-RS REs.

For 8, 12, and 16 antenna ports, there is an option to multiplex either two ports over two REs using OCC2 (CDM2) or four ports on four REs using OCC4 (CDM4). FIGS. 8A and 8B illustrate an example of port multiplexing with OCC4 (CDM4) for a 12 port resource and a 16 port resource, respectively. As shown, the four REs with the same letter are in one OCC4 group. The benefit of using OCC4 is that up to 6 dB processing gain can be achieved for channel estimation if the channel doesn't change fast in either time or frequency domain.

CSI-RS can be transmitted periodically on certain subframes, also referred as CSI-RS subframes. A CSI-RS subframe configuration consists of a subframe periodicity and a subframe offset. The periodicity is configurable at 5, 10, 20, 40 and 80 ms in LTE.

A CSI-RS configuration consists of a CSI-RS resource configuration and a CSI-RS subframe configuration. A UE can also be configured with one or multiple zero power (ZP) CSI-RS resources. A ZP CSI-RS subframe configuration is also associated with each ZP CSI-RS configuration.

To improve channel estimation in adjacent cells, an eNB may not transmit any signals in certain CSI-RS REs, referred as zero-power CSI-RS or ZP CSI-RS. The CSI-RS used for CSI estimation is also referred to as non-zero power CSI-RS or NZP CSI-RS. Only CSI-RS REs for four antenna ports can be allocated to ZP CSI-RS. A ZP CSI-RS subframe configuration is also associated with ZP CSI-RS. It can be the same as or different from a NZP CSI-RS configuration.

The concept of CSI process is introduced in TM10. A CSI process is associated with a NZP CSI-RS resource and a CSI interference measurement (CSI-IM) resource. A CSI-IM resource is defined by a ZP CSI-RS resource and a ZP CSI-RS subframe configuration. A UE can be configured with multiple CSI processes. The multiple CSI processes was introduced to support Coordinated Multi-Point (COMP) transmission in which a UE measures and feeds back CSI associated with each transmission point (TP) to an eNB. Based on the received CSIs, the eNB may decide to transmit data to the UE from one of the TPs.

Measurement restriction was introduced in LTE release 13 for TM9 and TM10, in which CSI measurement for a UE may be restricted to a CSI-RS resource or a CSI-IM resource in one subframe. Measurement restriction can be configured in the form of channel measurement restriction or interference measurement restriction or both.

For a UE in transmission mode 9 or 10 and for a CSI process, if the UE is configured with parameter CSI-Reporting-Type by higher layers, and CSI-Reporting-Type is set to 'CLASS B', and parameter channelMeasRestriction is configured by higher layers, the UE shall derive the channel measurements for computing the CQI value reported in uplink subframe n and corresponding to the CSI process, based on only the most recent, no later than the CSI reference resource, non-zero power CSI-RS within a configured CSI-RS resource associated with the CSI process.

For a UE in transmission mode 10 and for a CSI process, when parameters CSI-Reporting-Type and interference-MeasRestriction is configured by higher layers, the UE shall derive the interference measurements for computing the CQI value reported in uplink subframe n and corresponding to the CSI process, based on only the most recent, no later than the CSI reference resource, configured CSI-IM resource associated with the CSI process.

Channel measurement restriction to one CSI-RS subframe is needed in Class B in which the precoding for CSI-RS may be different in different CSI-RS subframes.

SUMMARY

To address the foregoing problems with existing solutions, disclosed are systems and methods for flexible channel state information-reference signal transmission.

According to certain embodiments, a method by a wireless device is provided for restricting channel state information (CSI) measurement. The method includes receiving, from a network node, information identifying a first subset of channel state information-reference signal (CSI-RS)

resources to be used in performing CSI measurements. The first subset of CSI-RS resources are associated with a first portion of a frequency band that is less than all of the frequency band. CSI measurements are performed in the first subset of CSI-RS resources that are associated with the first portion of the frequency band.

According to certain embodiments, a wireless device for restricting CSI measurement includes processing circuitry configured to receive, from a network node, information identifying a first subset of CSI-RS resources to be used in performing CSI measurements. The first subset of CSI-RS resources are associated with a first portion of a frequency band that is less than all of the frequency band. The processing circuitry performs CSI measurements in the first subset of CSI-RS resources being associated with the first portion of the frequency band.

According to certain embodiments, a method by a network node is provided for restricting CSI measurement. The method includes signaling, to a first wireless device, information identifying a first subset of CSI-RS resources to be used in performing CSI measurements. The first subset of CSI-RS resources are associated with a first portion of a frequency band that is less than all of the frequency band. CSI feedback is received from the first wireless device. The CSI feedback is associated with the CSI measurements performed using the first subset of CSI-RS resources.

According to certain embodiments, a network node for restricting CSI measurement includes processing circuitry configured to signal, to a first wireless device, information identifying a first subset of CSI-RS resources to be used in performing CSI measurements. The first subset of CSI-RS resources are associated with a first portion of a frequency band that is less than all of the frequency band. The processing circuitry receives CSI feedback from the first wireless device. The CSI feedback is associated with the CSI measurements performed using the first subset of CSI-RS resources.

According to certain embodiments, a method is provided for restricting CSI measurement. The method includes receiving a CSI-RS resource configuration for a plurality of antenna ports, identifying a first subset of the plurality of antenna ports over which CSI measurements are to be performed in a first subframe, and performing, in the first subframe, the CSI measurements over the first subset of antenna ports.

According to certain embodiments, a wireless device for restricting CSI measurement includes processing circuitry configured to receive a CSI-RS resource configuration for a plurality of antenna ports, identify a first subset of the plurality of antenna ports over which CSI measurements are to be performed in a first subframe, and perform, in the first subframe, the CSI measurements over the first subset of antenna ports.

According to certain embodiments, a method by a network node is provided for restricting CSI measurement. The method includes signaling, to a wireless device, a CSI-RS resource configuration for a plurality of antenna ports and a first subset of the plurality of antenna ports over which CSI measurements are to be performed in a first subframe. CSI feedback is received from the wireless device. The CSI feedback is associated with the CSI measurements performed over the first subset of the plurality of antenna ports.

According to certain embodiments, a network node for restricting CSI measurement includes processing circuitry configured to signal, to a wireless device, a CSI-RS resource configuration for a plurality of antenna ports and a first subset of the plurality of antenna ports over which CSI measurements are to be performed in a first subframe. CSI feedback is received from the wireless device. The CSI feedback is associated with the CSI measurements performed over the first subset of the plurality of antenna ports.

Certain embodiments of the present disclosure may provide one or more technical advantages. For example, certain embodiments may provide reduced CSI-RS resource overhead and potential to support a large number of antennas. Another advantage may be that certain embodiments provide flexible CSI-RS transmission and CSI measurement. Still another advantage may be that CSI-RS transmission may be adapted to the number of wireless devices in a cell and different wireless device mobilities. Another advantage still may be that techniques may provide different CSI feedback granularity to support single user multiple-input multiple-output (SU-MIMO) and multiple user multiple-input multiple-output (MU-MIMO) feedbacks.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, on which.

DETAILED DESCRIPTION

Figure 1:
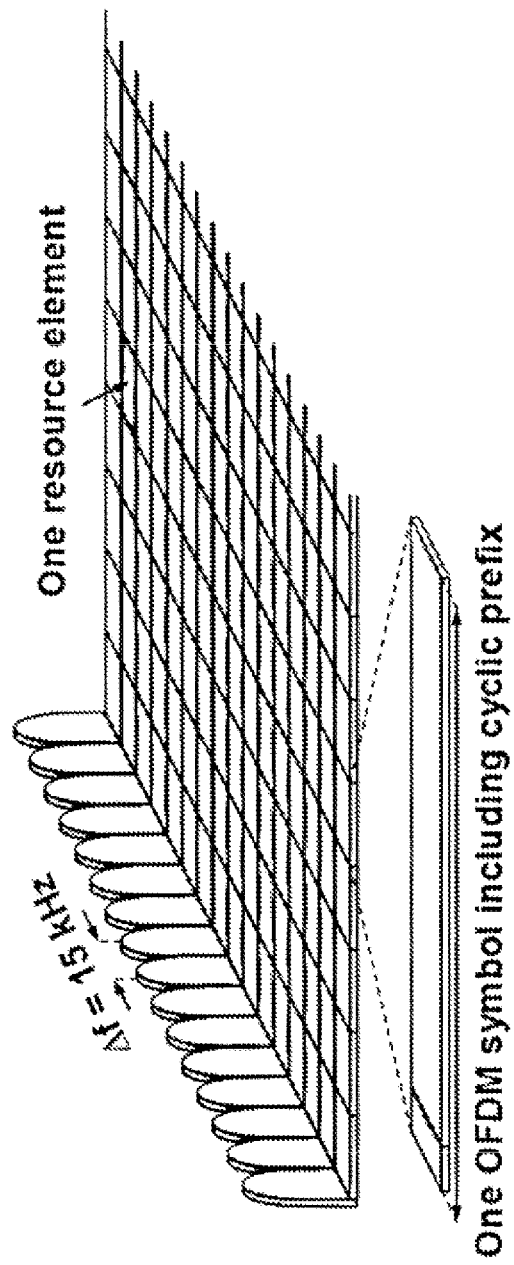
FIG. 1 illustrates the basic LTE downlink physical resource as a time-frequency grid.
Figure 2:
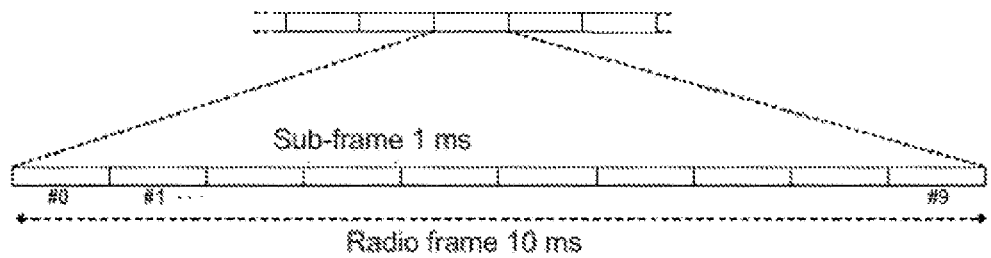
FIG. 2 illustrates LTE downlink transmissions in the time domain.
Figure 3:
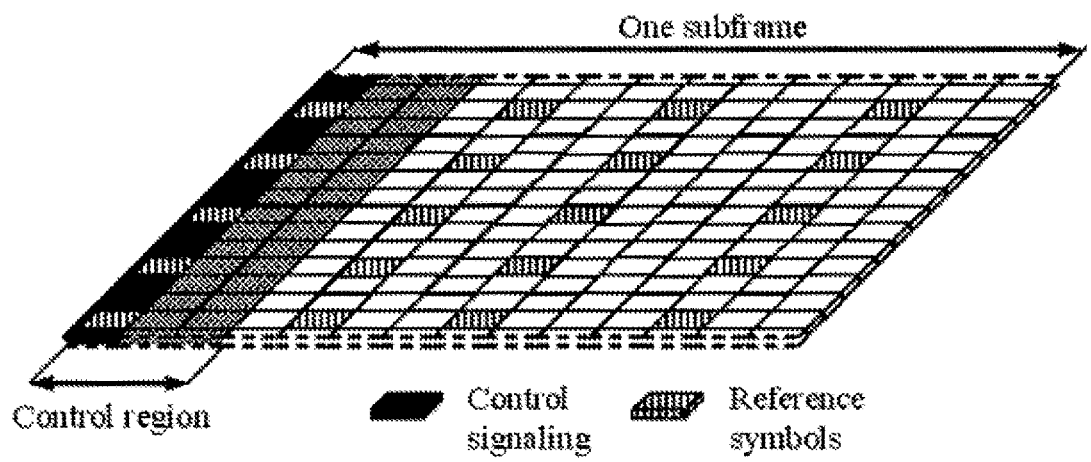
FIG. 3 illustrates a downlink system with three Orthogonal Frequency Division Multiplexing (OFDM) symbols.
Figure 4:
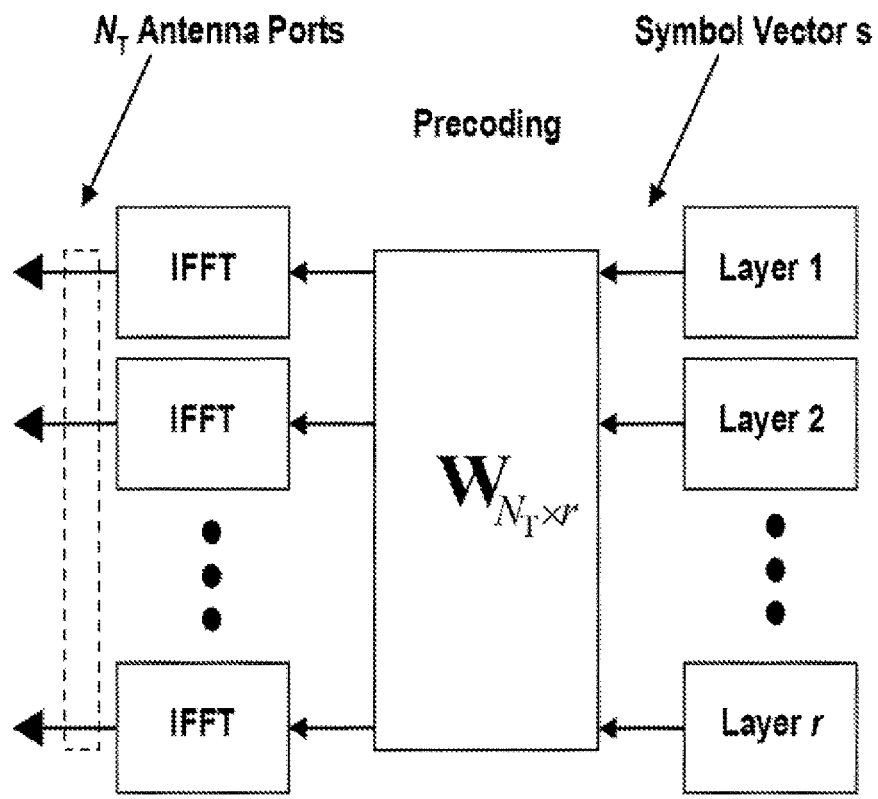
FIG. 4 illustrates an example spatial multiplexing operation.
Figure 5:
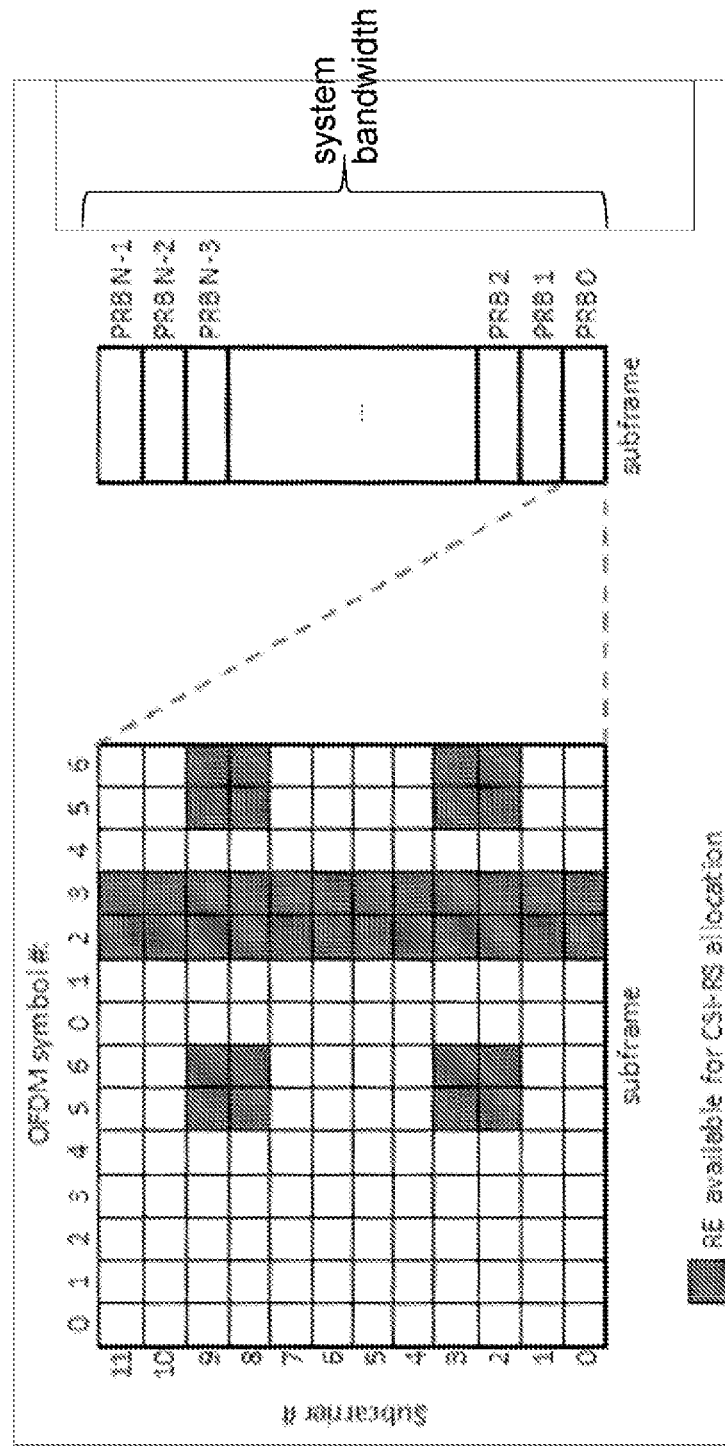
FIG. 5 illustrates the resource elements (REs) available for channel state information-reference signal (CSI-RS) allocations in a physical resource block (PRB)
Figure 6A:
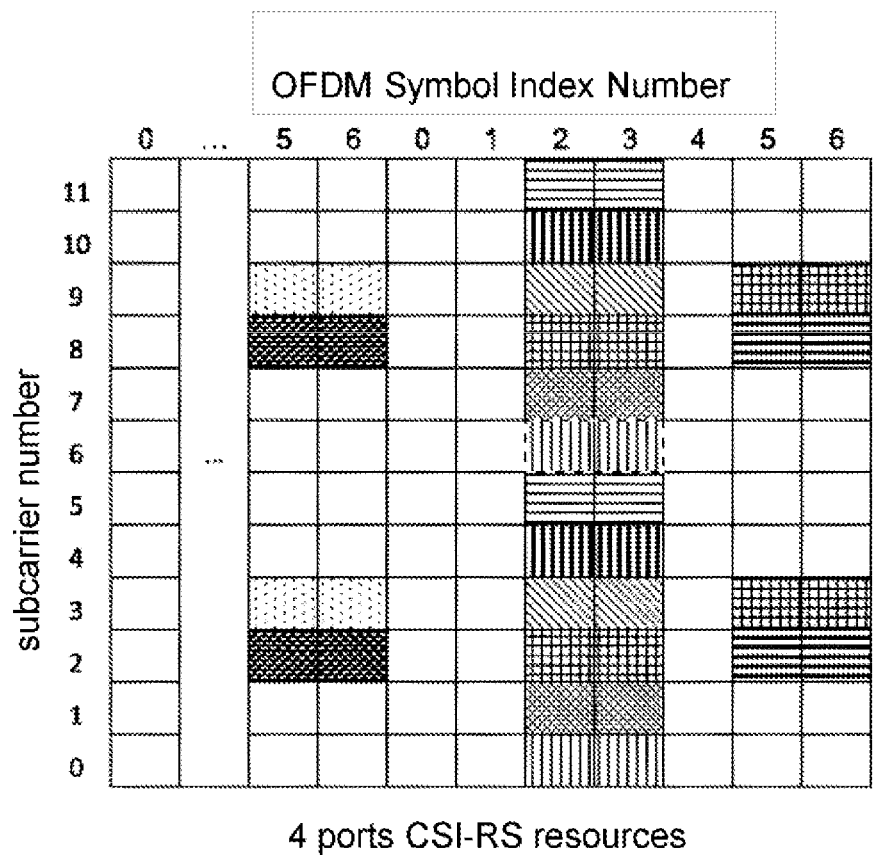
FIGS. 6A and 6B illustrate CSI-RS patterns or resource configurations for four and eight antenna ports, respectively.
Figure 6B:
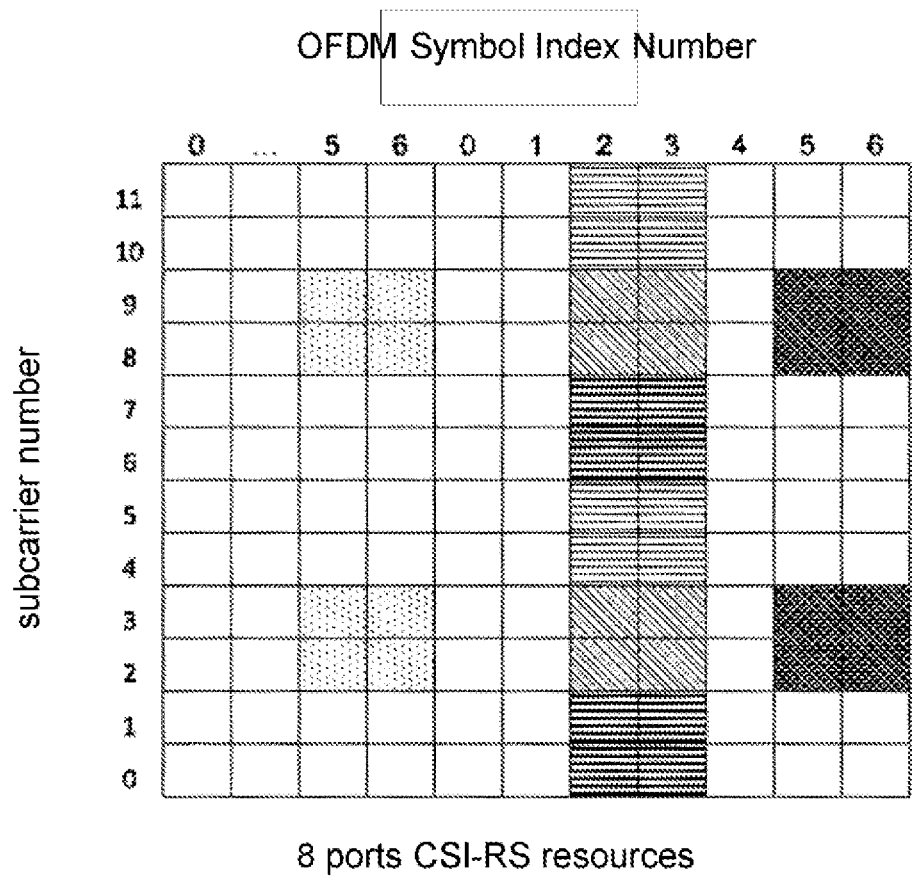
Figure 7A:
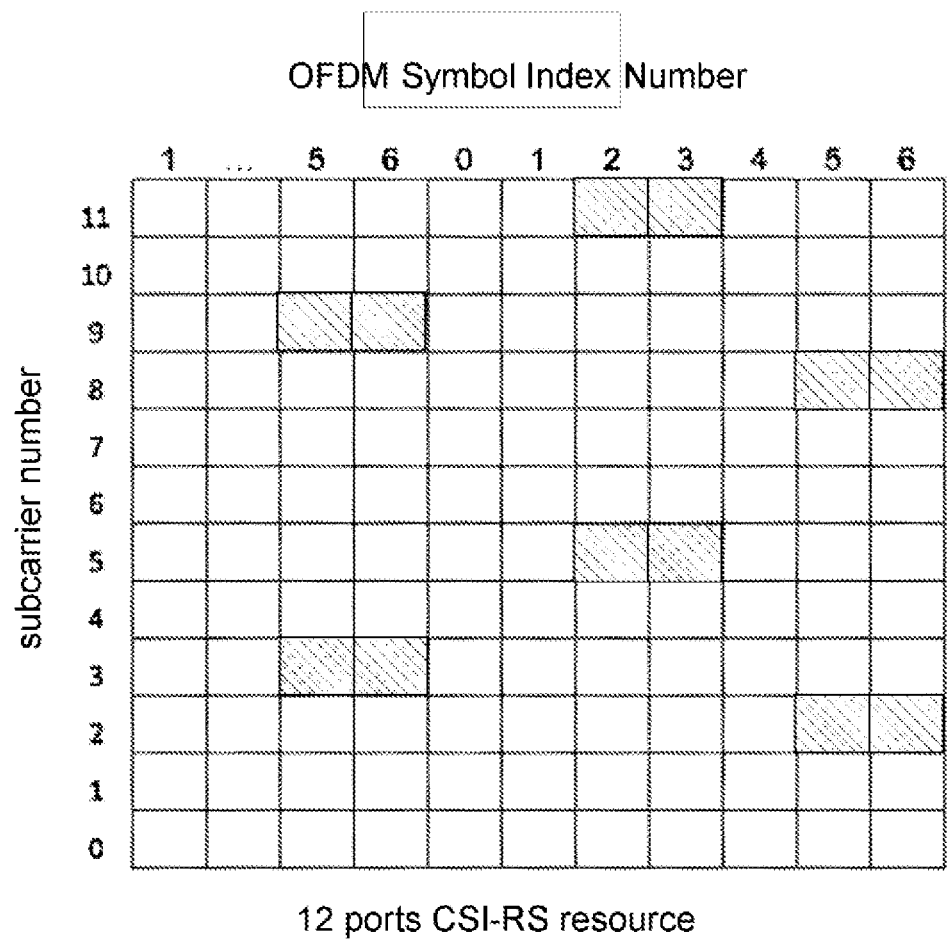
FIGS. 7A and 7B illustrate CSI-RS pattern or resource configuration for twelve and sixteen antenna ports, respectively.
Figure 7B:
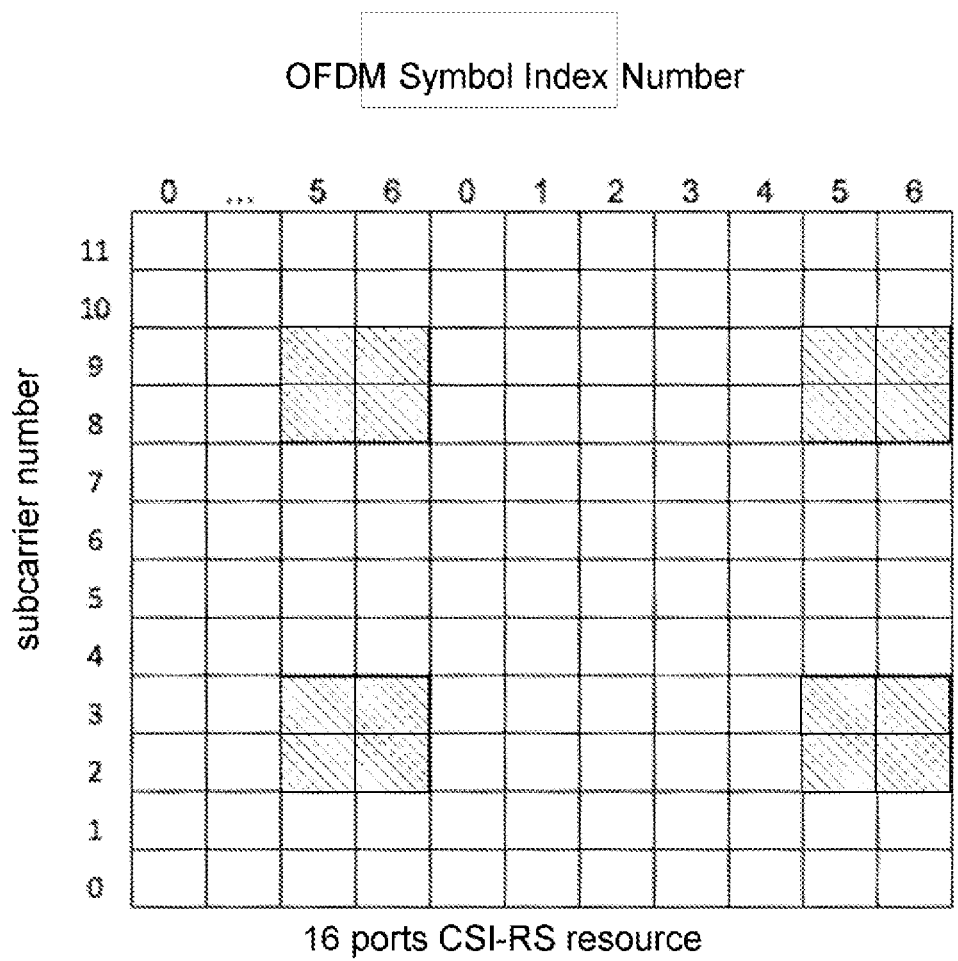
Figure 8A:
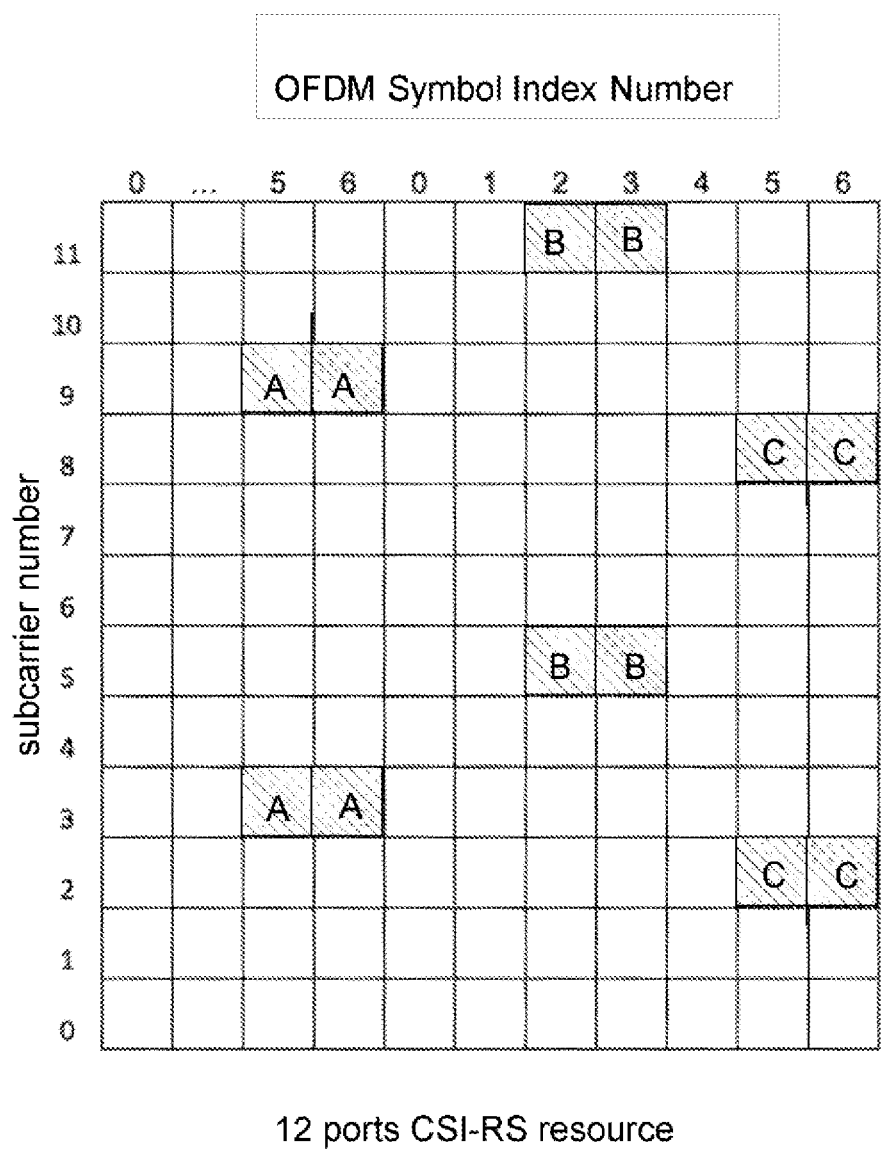
FIGS. 8A and 8B illustrate an example port multiplexing with an orthogonal cover codes (OCC) length of four.
Figure 8B:
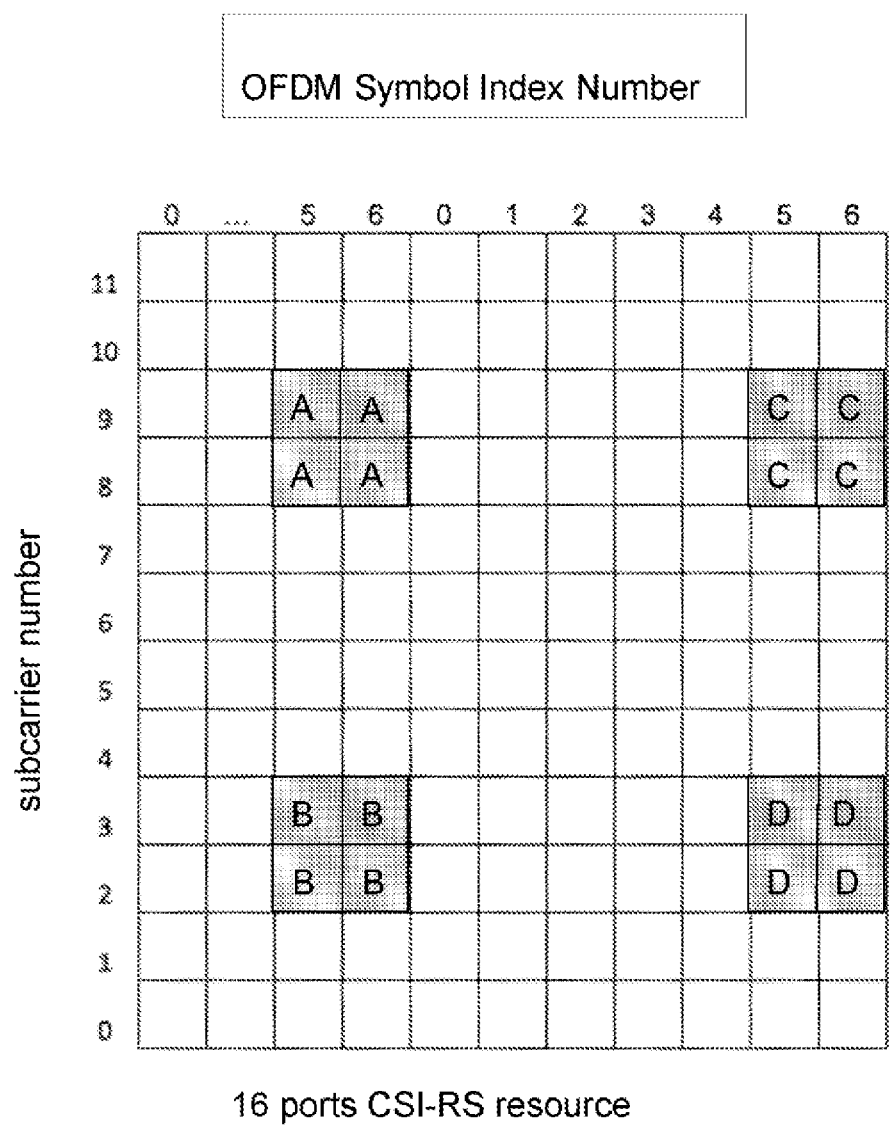

In LTE Rel-14, up to thirty-two antenna ports are to be supported in the downlink (DL). However, there are maximum forty Channel State Information-Reference Signal (CSI-RS) resource elements (REs) available per physical resource block (PRB) in a CSI-RS subframe. As such, only one 32-port CSI-RS configuration can be supported per CSI-RS subframe. To avoid CSI-RS collision in adjacent cells, CSI-RS in adjacent cells may be configured in different subframes. For example, CSI-RS may be time division multiplexed (TDM). In this case, CSI-RS would collide with PDSCH data in adjacent cells. If zero power (ZP) CSI-RS is also configured to improve wireless device channel estimation in adjacent cells, then the resource overhead would be very high. To support more than thirty-two antenna ports, more CSI-RS REs are needed per PRB in each CSI-RS subframes. As such, there is a CSI-RS resource limitation issue for supporting 32 or more antenna ports. How to reduce CSI-RS overhead is clearly a problem.

Secondly, the current CSI-RS subframes are semi-statically configured. CSI-RS is transmitted regardless if there are wireless devices receiving a given CSI-RS transmission or not. The CSI-RS subframes are common to all wireless devices in a cell. To support wireless devices with different mobilities, smaller CSI-RS subframe periodicity is commonly used such that more frequent CSI feedback can be supported for medium to high mobility wireless devices, which means more CSI-RS resource overhead even there is only low mobility wireless devices in a cell.

To support multiple user multiple-input multiple-output (MU-MIMO), more accurate CSI feedback is required. However, more accurate CSI feedback means higher uplink overhead. Currently, the same CSI granularity is supported in both periodic and aperiodic CSI feedback. In the current system, a network node, such as an eNB, may request CSI feedback at any subframe by triggering an aperiodic CSI feedback from a wireless device. However, the CSI granularity is the same for CSI fed back at different times.

Certain embodiments provide frequency domain CSI measurement restriction to reduce the required CSI-RS REs for large number of antennas. Specifically, a UE can be requested to measure CSI over a fraction of the PRBs within the system bandwidth in a CSI-RS subframe. This can be achieved through CSI measurement restriction. For example, CSI measurements may be performed on a subset of PRBs that is indicated to a wireless device. The measurement restriction can be semi-statically or dynamically transmitted to a wireless device.

A wireless device may consider the CSI-RS REs in other PRBs as used for another purpose. For example, CSI-RS REs in other PRBs may be used for CSI-RS transmission targeting other wireless devices. Thus, a network node such as an eNB may transmit CSI-RS on one subset of PRBs to a group of wireless devices while transmitting CSI-RS on another subset of PRBs to a different group of wireless devices. The CSI-RS on the two subsets of PRBs may have different configurations, for example, with different CSI-RS reporting types (i.e. CLASS A or CLASS B) or the same Class B reporting type but different CSI-RS precodings.

As another example, CSI-RS REs may be used as zero-power CSI-RS. In other words, nothing may be transmitted on the REs. Adjacent cells may coordinate CSI-RS transmission. For example, different cells may transmit CSI-RS on different subsets of PRBs to improve channel estimation based on CSI-RS.

Certain embodiments may include antenna port level CSI measurement restriction. To reduce the required CSI-RS REs for a large number of antennas, a wireless device may be requested to measure CSI over a subset of the configured antenna ports in a CSI-RS subframe. For example, a UE may be requested to measure CSI based on only eight out of thirty-two antenna ports. In a particular embodiment, the subset of antenna ports can be preconfigured. In particular embodiments, the request can be either semi-statically configured or dynamically indicated/signaled. For example, semi-static configuration may be used for periodic CSI report. Dynamic signaling can be used for aperiodic CSI reports in between periodic reports. The CSI feedback can be based on a codebook of the subset antenna ports (e.g. 8 ports) or a codebook of full antenna ports (e.g. 32 ports).

Certain embodiments may provide scheduled CSI transmission without CSI-RS subframe configuration. Specifically, CSI-RS transmission may occur in a non-CSI-RS subframe. A wireless device can be dynamically signaled in a subframe whether CSI-RS is present or not in the subframe. If CSI-RS is present in a subframe, a wireless device maybe further instructed to measure CSI based on the CSI-RS transmitted in the subframe. In a particular embodiment, the dynamic scheduling can be done through a DL DCI message. A wireless device may be further signaled to report the measured CSI in a future subframe. In a particular embodiment, the signaling can be done through a UL grant.

To reduce the required CSI-RS REs for a large number of antenna ports, a wireless device can be requested to measure CSI using CSI-RS in a fraction of the PRBs within the system bandwidth in a CSI-RS subframe.

Figure 9:
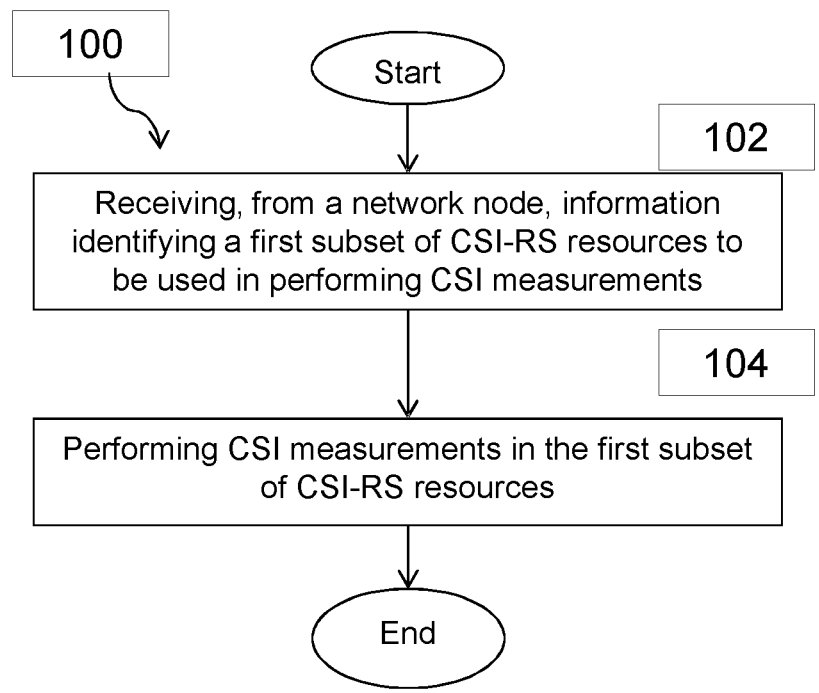
FIG. 9 illustrates an example method by a wireless device for restricting channel state information (CSI) measurement, according to certain embodiments.

FIG. 9 illustrates an example method 100 by a wireless device for restricting CSI measurement, according to certain embodiments. In a particular embodiment, the wireless device may include wireless device 1310 described below with respect to FIGS. 21 and 23.

The method may begin at step 102 when wireless device 1310 receives information identifying a first subset of CSI-RS resources to be used in performing CSI measurements. According to certain embodiments, the information may be received from a network node such as network node 1315 described below with respect to FIGS. 21 and 22. The information may be received in semi-static signaling or in dynamic signaling, according to various embodiments. According to a particular embodiment, the information may be received as downlink control information (DCI). Additionally, the DCI may be received in a common control channel search space or a UE-specific search space. According to certain embodiments, the first subset of CSI-RS resources is associated with a first portion of a frequency band that is less than the entire frequency band. According to a particular embodiment, the frequency band may include a system bandwidth in a CSI-RS subframe.

According to a particular embodiment, the frequency band may consist of a plurality of PRBs. For example, a first portion of the frequency band may consist of a first subset of PRBs in the frequency band, and the first subset of CSI-RS resources may include CSI-RS resources in the first subset of PRBs. Additionally, a second subset of CSI-RS resources that is different from the first subset of CSI-RS resources may be associated with a second subset of PRBs that is not to be used when performing CSI measurements. In another embodiment, the second subset of CSI-RS resources may be associated with a second portion of the frequency band that is less than the entire frequency band, and the second subset of CSI-RS resources may also be used in performing CSI measurements.

In a particular embodiment, for example, the information identifying the first subset of CSI-RS resources may include one or more parameters identifying the first subset of PRBs. According to a particular embodiment, wireless device 1310 may transmit CSI feedback that includes one or more values associated with the CSI measurements performed in the first subset of CSI-RS resources.

At step 104, wireless device 1310 performs CSI measurements in the first subset of CSI-RS resources that are associated with the first portion of the frequency band. According to a particular embodiment, the information identifying the first subset of CSI-RS resources may include a set of antenna ports. In such an embodiment, wireless device 1310 may perform the CSI measurements in the first subset of CSI-RS resources associated with the set of antenna ports.

According to a particular embodiment, the information identifying the first subset of CSI-RS resources may additionally or alternatively include a set of even number PRBs or a set of odd number PRBs in the frequency band. Wireless device 1310 may perform the CSI measurements on the first subset of CSI-RS resources configured on the set of even number PRBs or the set of odd number PRBs. According to a particular embodiment, the information identifying the first subset of CSI-RS resources may include every M PRBs in the frequency band, where M is greater than one. According to another particular embodiment, the information identifying the first subset of CSI-RS resources may include a subset of precoding resource block groups (PRGs).

According to a particular embodiment, the method may additionally include transmitting, from the wireless device 1310 to network node 1315, CSI feedback that includes one or more values associated with the CSI measurements performed in the first subset of CSI-RS resources. Additionally, according to certain embodiments, the CSI feedback may also include one or more values associated with the CSI measurements performed in the second subset of CSI-RS resources, where the second subset of CSI-RS resources is identified. In a particular embodiment, the information identifying the first subset of CSI-RS resources may be associated with a first CSI reporting type, and the CSI feedback may include a report of the first CSI reporting type. Likewise, the second subset of CSI-RS resources may be associated with a second CSI reporting type, and the CSI feedback may include a report of the second CSI reporting type. In a particular embodiment, the first type of CSI report may be associated with a first set of PRBS while the second type of CSI report is associated with a second set of PRBs.

According to certain embodiments, the information received in step 102 may identify a first subframe in which the CSI measurements are to be performed. Additionally, in a particular embodiment, wireless device 1310 may receive information identifying a second subset of CSI-RS resources to be used in performing CSI measurements in a second subframe. For example, the first subframe may be dynamically configured as a non-regular CSI-RS subframe that is not included in a plurality of regular CSI-RS subframes in which the wireless device 1310 is configured to perform the CSI measurements. Wireless device 1310 may receive an indication from network node 1315 that CSI-RS is included in the non-regular CSI-RS subframe.

Figure 10:
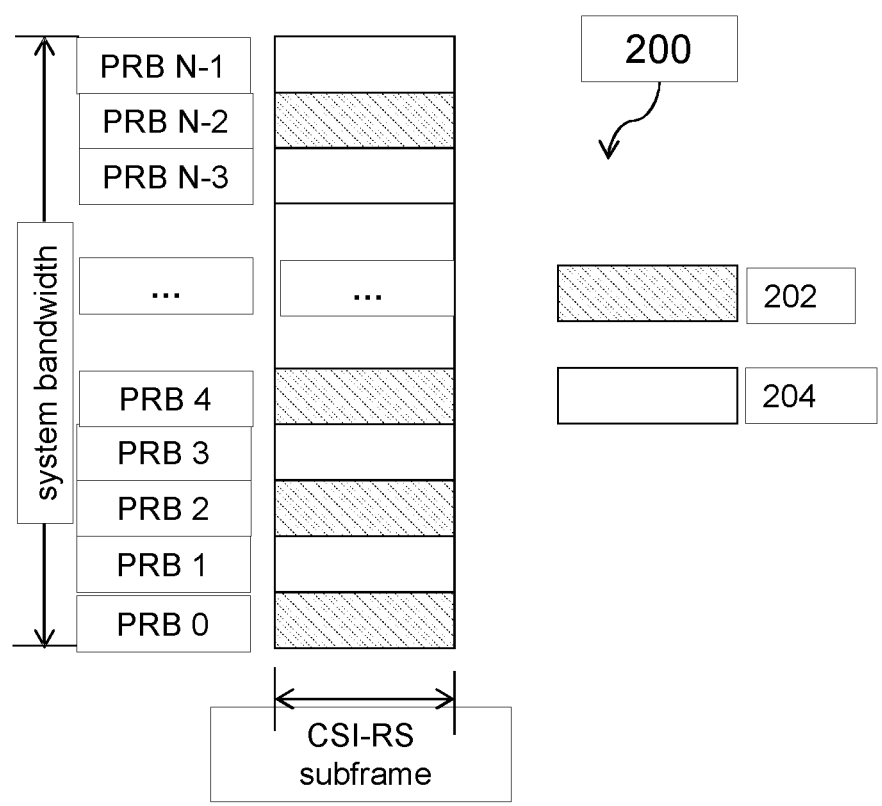
FIG. 10 illustrates an example of CSI-RS allocation for a wireless device over a subset of PRBs, in accordance with certain embodiments.

FIG. 10 illustrates an example of CSI-RS allocation 200 for a wireless device over a subset of PRBs. The subset of PRBs may include a fraction of the PRBs within the system bandwidth to reduce the required CSI-RS REs for a large number of antennas. As shown in FI-GURE 10, a first subset of PRBs 202 may be distinguished from a second subset of PRBs 204.

According to certain embodiments, the first subset of PRBs 202 may comprise even number PRBs and the second subset of PRBS 204 may comprise odd-numbered PRBs. Accordingly, the wireless device may be signaled with identifying information indicating that wireless device is to measure channels from a serving cell using REs containing CSI-RS in even-numbered PRBs (i.e. PRB 0, PRB2, . . . ) or in odd-numbered PRBs (i.e. PRB 1, PRB 3, . . . ) in a CSI-RS subframe.

The subsets of PRBs can be semi-statically configured for a wireless device as part of CSI measurement restriction. The measurement restriction can be semi-statically configured to a wireless device. For example, a wireless device may be configured to measure CSI over the even number PRBs 202 as shown in FIG. 10. The wireless device then measures CSI based on only the CSI-RS transmitted in the even-numbered PRBs in CSI-RS subframes for both periodic and aperiodic CSI reports.

The wireless devices in one group (e.g. group A) may assume the CSI-RS REs in the other set of PRBs (i.e. odd-numbered PRBs as depicted in FIG. 10) are reserved and are not used for PDSCH transmission. In one embodiment, the two groups of wireless devices may have the same CSI-RS resource configuration. For example, the two groups of wireless devices may have the same number of CSI-RS ports and the same CSI-RS REs in the subframe.

Figure 11:
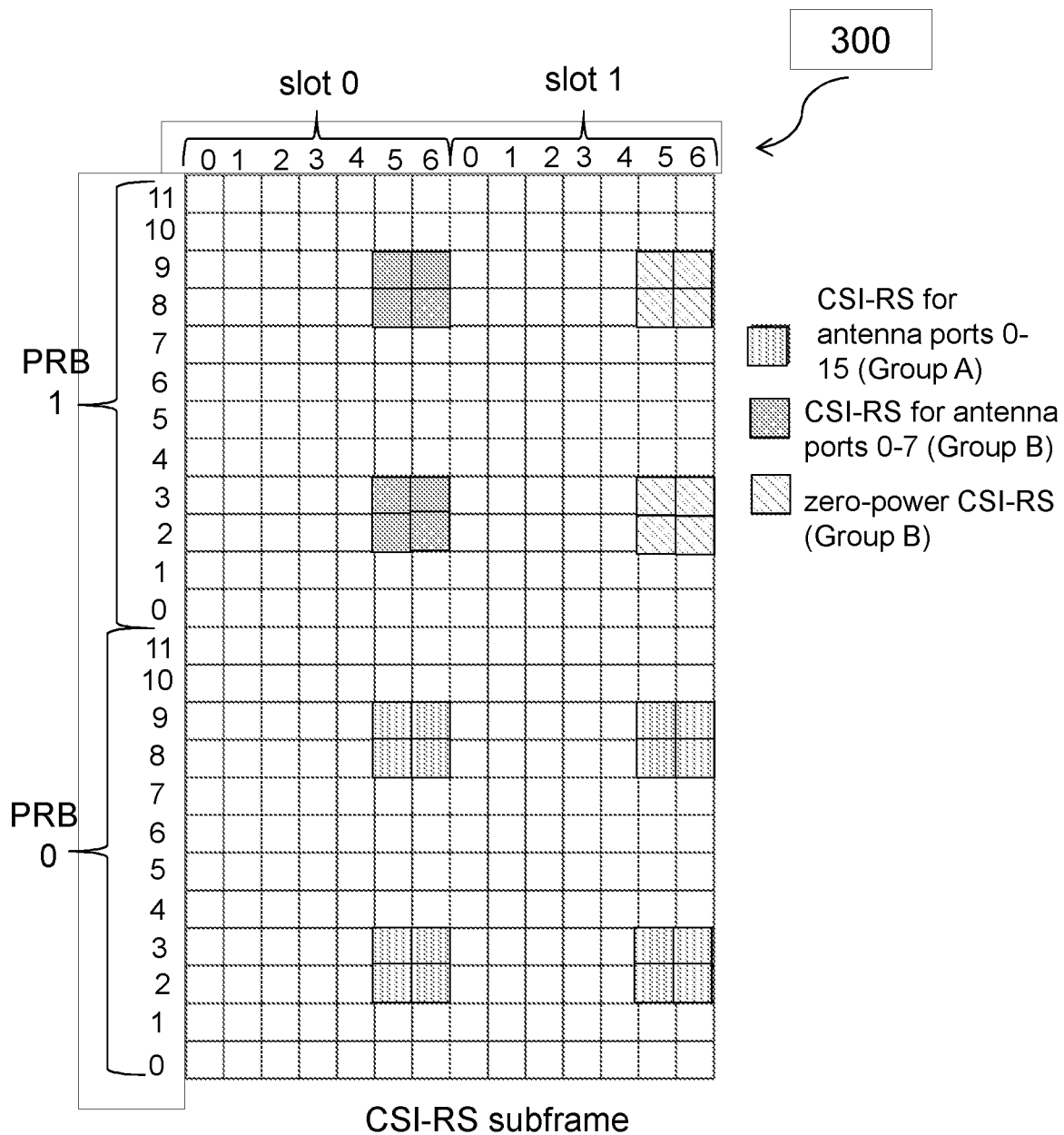
FIG. 11 illustrates an example CSI-RS configuration over two subsets of PRBs with different number of CSI-RS ports, in accordance with certain embodiments.

In certain embodiments, when the two groups of wireless devices have a different number of CSI-RS ports such as, for example, one group with eight ports and the other with sixteen ports, the wireless devices in the group with smaller number of CSI-RS ports may be configured with additional zero-power CSI-RS on the REs that are configured for CSI-RS for the other group. FIG. 11 illustrates an example CSI-RS configuration over two subsets of PRBs with different number of CSI-RS ports. Wireless devices in Group A may be configured with 16 port CSI-RS, while wireless devices in Group B are configured with 8 port CSI-RS and also 8 port zero power CSI-RS.

According to certain embodiments, wireless devices in group A and wireless devices in group B may be associated with different cells. Returning to FIG. 10, in certain other embodiments, the first subset of PRBs 202 may be associated with a first cell and the second subset of PRBS 204 may be associated with a second cell.

In another embodiment, the first subset of PRBs 202 may be associated with a first CSI process and the second subset of PRBs 204 may be associated with a second process. For example, when a wireless device is configured with two CSI processes, CSI process A and CSI process B, the wireless device may be configured to measure CSI for CSI process A in one set of PRBs 202 and for CSI process B in the other set of PRBs 204.

In still another embodiment, the first subset of PRBs 202 may be associated with a first type of CSI report while the second subset of PRBs 204 are associated with a different type of CSI report. For example, when a wireless device 1310 is configured with both Class A and Class B types of CSI reports, the wireless device may be configured to measure CSI for Class A type of reporting on one set of PRBs 202 (depicted as even-numbered PRBs in FIG. 10) and for Class B type of CSI reporting on another set of PRBs 204 (depicted as odd-numbered PRBs in FIG. 10). Dynamic signaling, such as for example in the case of aperiodic CSI reports, may be used to indicate whether a Class A or Class B type of CSI should be reported.

In still another embodiment, the first subset of PRBs 202 may be associated with a first subset of antenna ports while the second subset of PRBs 204 is associated with a second subset of antenna ports. For example, a wireless device may be configured to measure channels on a subset of the configured antenna ports on one set of PRBs 202 and another subset of antenna ports on a different set of PRBs 204.

Figure 12:
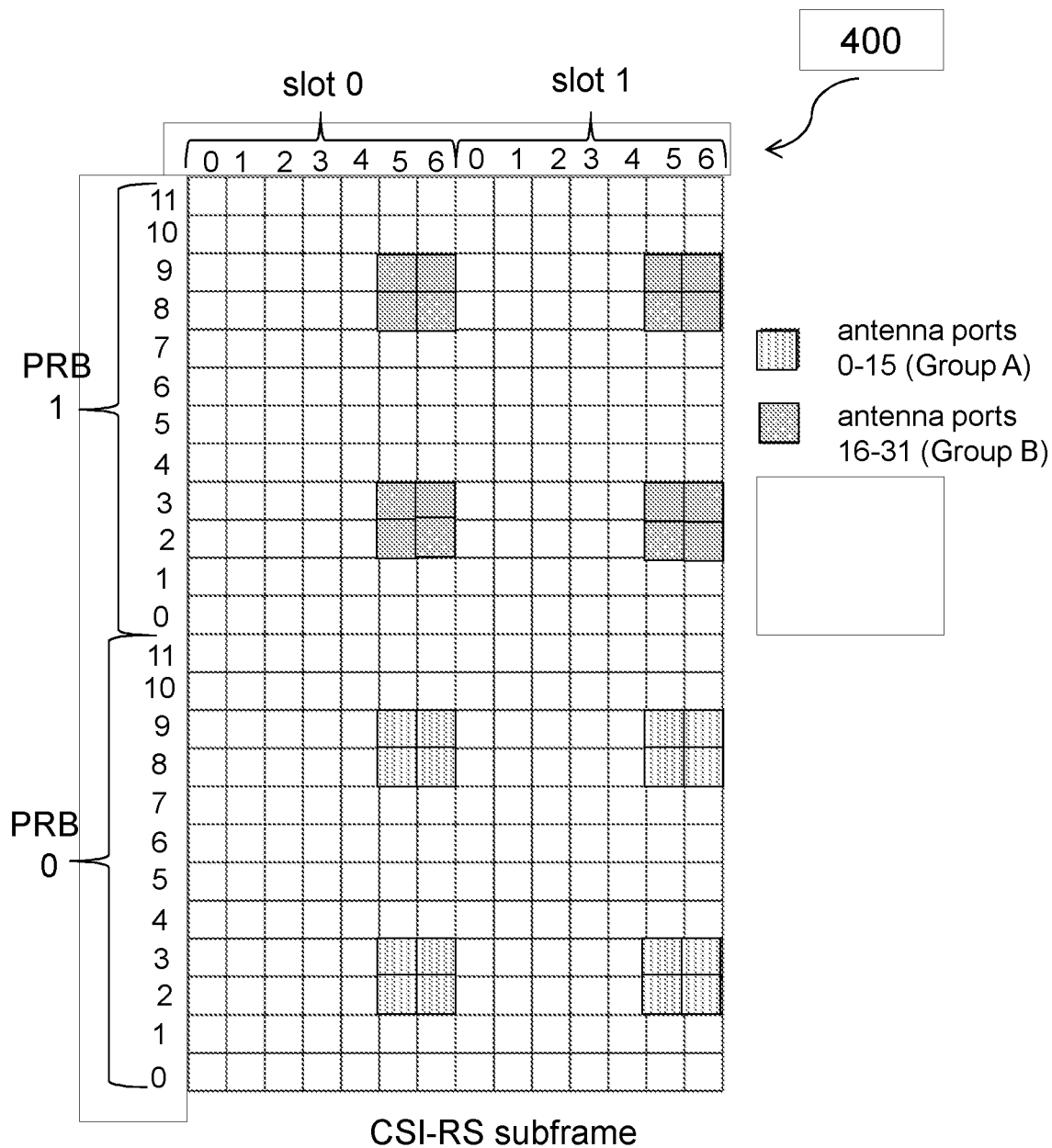
FIG. 12 illustrates another example of CSI-RS allocation for a wireless device over a subset of PRBs, in accordance with certain embodiments.

FIG. 12 illustrates an example CSI-RS resource allocation 400 where thirty-two CSI-RS ports are allocated over two PRBs that each includes sixteen ports. Stated differently, FIG. 12 illustrates an example of a system with thirty-two antenna ports, where antenna ports 0 to 15 (Group A) are allocated to PRB 0 and antenna ports 16-31 (Group B) are allocated to PRB 1. In this case, a wireless device may still report a single thirty-two port CSI based on the CSI-RS resource.

Figure 13:
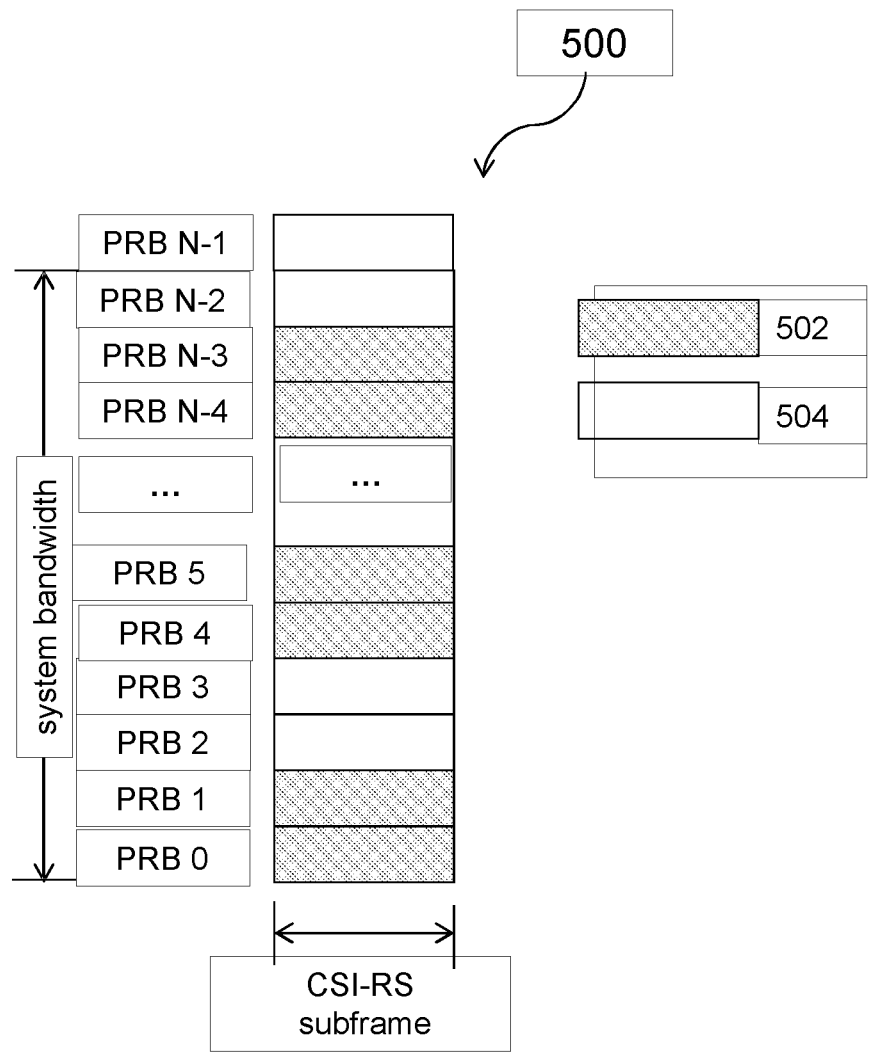
FIG. 13 illustrates an example of CSI-RS allocation for different CSI processes, in accordance with certain embodiments.

Although even and odd-numbered PRBs are used in the above examples, other ways of partitioning the bandwidth are also possible for measurement restriction. For example, even and odd PRBs, the measurement restriction may be applied to every M (M>1) PRBs. FIG. 13 illustrates a second example of CSI-RS allocation 500 for a wireless device over a subset of PRBs. As depicted, a wireless device may be configured to measure CSI over alternating blocks of two adjacent PRBs. A wireless device belonging to group A 502 is configured to measure CSI in PRBs 0, 1, 4, 5, ..., N−4, N−3. Conversely, another wireless device belonging to group B 504 is configured to measure CSI in PRBs 2, 3, 6, 7, ..., N−2, N−1.

In another example, the measurement restriction may be applied to the Precoding Resource block Groups (PRGs). For example, a wireless device may be restricted to measure only certain PRGs.

In certain embodiments, a wireless device may be configured for subband CQI reporting and CSI-RS measurement restriction, and the wireless device may use a subset of the subbands in the system bandwidth to calculate CSI. The network node restricts the wireless device's CSI-RS measurements by indicating to the wireless device which subbands the wireless device can use to calculate CSI ('valid subbands'). In this case, wideband CSI is only calculated using the valid subbands, and subband CSI reports such as subband CQI or PMI for the subbands not indicated as valid subbands are either not included by the wireless device in CSI reporting or are set to fixed, specified values. The measurement indication can be semi-statically indicated through RRC signaling, or may be dynamically signaled in a downlink control channel. In some embodiments, the wireless device may be configured for subband channel measurement restriction only for channel measurements, or only for subband interference measurement restriction, or the wireless device may be configured for both subband interference and channel measurement restriction.

In another embodiment when a wireless device is configured for subband CQI reporting and CSI-RS measurement restriction, the wireless device may not assume that CSI-RS are present in more than one subband. The wireless device then calculates CSI (for example CQI, RI, and PMI) for each subband independently of the other subbands. Optionally, the wireless device may then calculate a wideband CQI value that allows minimum quantization error for each subband when the differential CQIs are reported for each subband. A single value for RI and PMI may be reported in some reporting modes, in which case the reported RI and PMI correspond to the subband with highest CQI.

Figure 14:
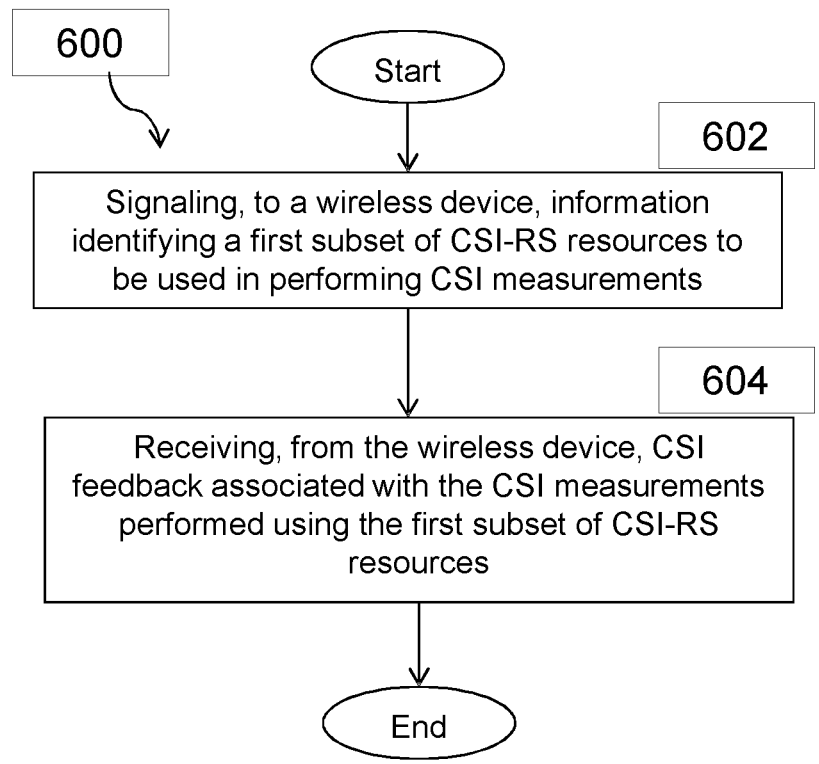
FIG. 14 illustrates an example method by a network node for restricting CSI measurement, according to certain embodiments.

FIG. 14 illustrates an example method 600 by a network node for restricting CSI measurement, according to certain embodiments. In a particular embodiment, the network node may include network node 1315 described below with respect to FIGS. 21 and 22.

The method may begin at step 602 when network node 1315 signals information identifying a first subset of CSI-RS resources to be used in performing CSI measurements to a wireless device. According to certain embodiments, the information may be signaled to a wireless device, which may include wireless device 1310 described below with respect to FIGS. 21 and 23 in particular embodiments. The information may also be signaled in semi-static signaling or in dynamic signaling, according to various embodiments. According to a particular embodiment, the information may be signaled as downlink control information (DCI). Additionally, the DCI may be signaled in a common control channel search space or a UE-specific search space. According to certain embodiments, the first subset of CSI-RS resources may be associated with a first portion of a frequency band that is less than all of the frequency band. According to a particular embodiment, the frequency band may include a system bandwidth in a CSI-RS subframe.

According to a particular embodiment, the frequency band may consist of a plurality of PRBs. For example, a first portion of the frequency band may consist of a first subset of PRBs in the frequency band, and the first subset of CSI-RS resources may include CSI-RS resources in the first subset of PRBs. A second subset of CSI-RS resources that are different from the first subset of CSI-RS resources may be associated with a second subset of PRBs that are not to be used when performing CSI measurements. In another embodiment, the second subset of CSI-RS resources may be associated with a second portion of the frequency band less than the entire frequency band, and the second subset of CSI-RS resources may also be used in performing CSI measurements.

In a particular embodiment, for example, the information identifying the first subset of CSI-RS resources may include one or more parameters identifying the first subset of PRBs.

According to another particular embodiment, the information identifying the first subset of CSI-RS resources may include a set of antenna ports. In such an embodiment, wireless device 1310 may perform the CSI measurements in the first subset of CSI-RS resources associated with the set of antenna ports.

According to a particular embodiment, the information identifying the first subset of CSI-RS resources may additionally or alternatively include a set of even-number PRBs or a set of odd number PRBs in the frequency band. Wireless device 1310 may perform the CSI measurements on the first subset of CSI-RS resources configured on the set of even number PRBs or the set of odd number PRBs. According to a particular embodiment, the information identifying the first subset of CSI-RS resources may include every M PRBs in the frequency band, where M is greater than one. According to another particular embodiment, the information identifying the first subset of CSI-RS resources may include a subset of precoding resource block groups (PRGs).

At step 604, network node 1315 receives CSI feedback from wireless device 1310. The CSI feedback may include one or more values associated with the CSI measurements performed in the first subset of CSI-RS resources by wireless device 1310. CSI measurements in the first subset of CSI-RS resources that is associated with the first portion of the frequency band.

According to certain embodiments, the CSI feedback may also include one or more values associated with the CSI measurements performed in the second subset of CSI-RS resources, where a second subset of CSI-RS resources is identified. In a particular embodiment, the information identifying the first subset of CSI-RS resources may be associated with a first CSI reporting type, and the CSI feedback may include a report of the first CSI reporting type. Likewise, the second subset of CSI-RS resources may be associated with a second CSI reporting type, and the CSI feedback may include a report of the second CSI reporting type. In a particular embodiment, the first type of CSI report may be associated with a first set of PRBS while the second type of CSI report is associated with a second set of PRBs.

According to a particular embodiment, the information signaled in step 602 may identify a first subframe in which the CSI measurements are to be performed. Additionally, network node 1315 may also signal information identifying a second subset of CSI-RS resources to be used in performing CSI measurements in a second subframe. In a particular embodiment, the first subframe may be dynamically configured as a non-regular CSI-RS subframe that is not included in a plurality of regular CSI-RS subframes in which the wireless device 1310 is configured to perform the CSI measurements. Network node 1315 may signal an indication to wireless device 1310 that CSI-RS is included in the non-regular CSI-RS subframe.

As described above with respect to FIG. 10, the information identifying a first subset of CSI-RS resources may identify a subset of PRBs that is a fraction of the PRBs within the system bandwidth. According to the various embodiments described above, the first subset of PRBs 202 may comprise even number PRBs and the second subset of PRBS 204 may comprise odd-numbered PRBs. Thus, the network node may signal identifying information indicating that wireless device is to measure channels from a serving cell using REs containing CSI-RS in even-numbered PRBs (i.e. PRB 0, PRB2, . . . ) or in odd-numbered PRBs (i.e. PRB 1, PRB 3, . . . ) in a CSI-RS subframe.

In certain other embodiments, the first subset of PRBs 202 may be associated with a first cell and the second subset of PRBS 204 may be associated with a second cell. Additionally or alternatively, the first subset of PRBs 202 may be associated with a first CSI process and the second subset of PRBs 204 may be associated with a second process. In still another embodiment, the first subset of PRBs 202 may be associated with a first type of CSI report while the second subset of PRBs 204 are associated with a different type of CSI report. In still another embodiment, the first subset of PRBs 202 may be associated with a first subset of antenna ports while the second subset of PRBs 204 is associated with a second subset of antenna ports.

Figure 15:
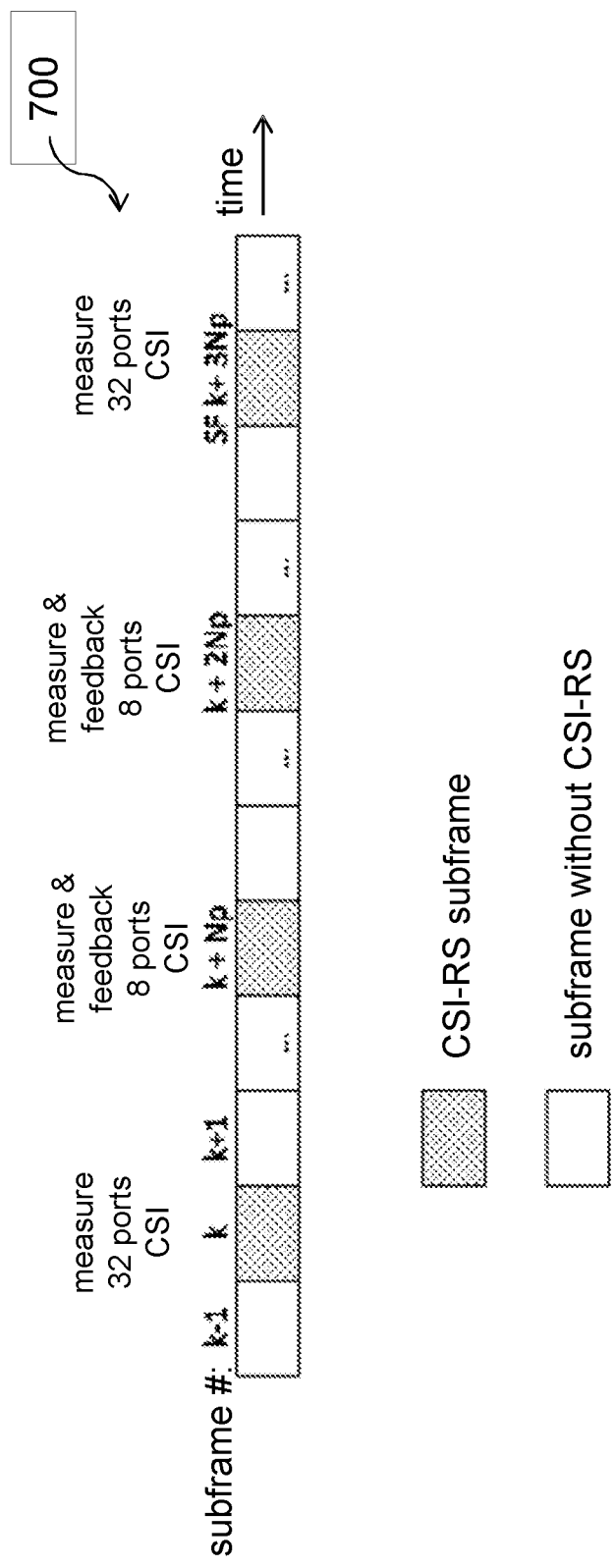
FIG. 15 illustrates an example of CSI measurement restriction on a subset of antenna ports, in accordance with certain embodiments.

According to certain embodiments, a wireless device may be configured to measure CSI over the full set of the configured antenna ports in some CSI-RS subframes while measuring CSI over a subset of the antenna ports in some other subframes. FIG. 15 illustrates an example of CSI measurement restriction 700 on a subset of antenna ports. As depicted, CSI measurements on eight out of thirty-two antenna ports are performed in some CSI-RS subframes while on all thirty-two ports in other subframes. The subframes over which CSI for a subset of antenna ports is measured can be semi-statically configured.

In certain embodiments, two CSI-RS subframe configurations, each with different number of antenna ports, can be signaled to a wireless device. One subframe configuration can be used for both periodic CSI feedback (e.g. thirty-two port CSI-RS subframes) and the other can be used for only aperiodic feedback (e.g. the eight port CSI-RS subframes). In the subframe configured with eight ports, only eight port CSI-RS resource may be configured and only 8 port CSI-RS may be transmitted.

In certain other embodiments, only thirty-two ports CSI-RS subframes may be configured for a wireless device, but a wireless device may be requested to measure CSI based on only a subset of the thirty-two antenna ports in some subframes. In a particular embodiment, the subset of antenna ports may be preconfigured. In a particular embodiment, the request for CSI measurement on a subset of antenna ports may be dynamically indicated or signaled in uplink scheduling grant. In a particular embodiment, the CSI feedback for the subset of the antenna ports may be based on either a codebook of the subset of antenna ports (e.g. an eight port codebook) or a codebook of full antenna ports (e.g. thirty-two ports). In a particular embodiment where the codebook of full antenna ports is used for CSI feedback for the subset of the antenna ports that are configured, then the wireless device can assume that the ports except the subset of antenna ports configured for CSI feedback are muted, wherein no CSI-RS transmission in the ports except the subset of antenna ports configured for CSI feedback.

Figure 16:
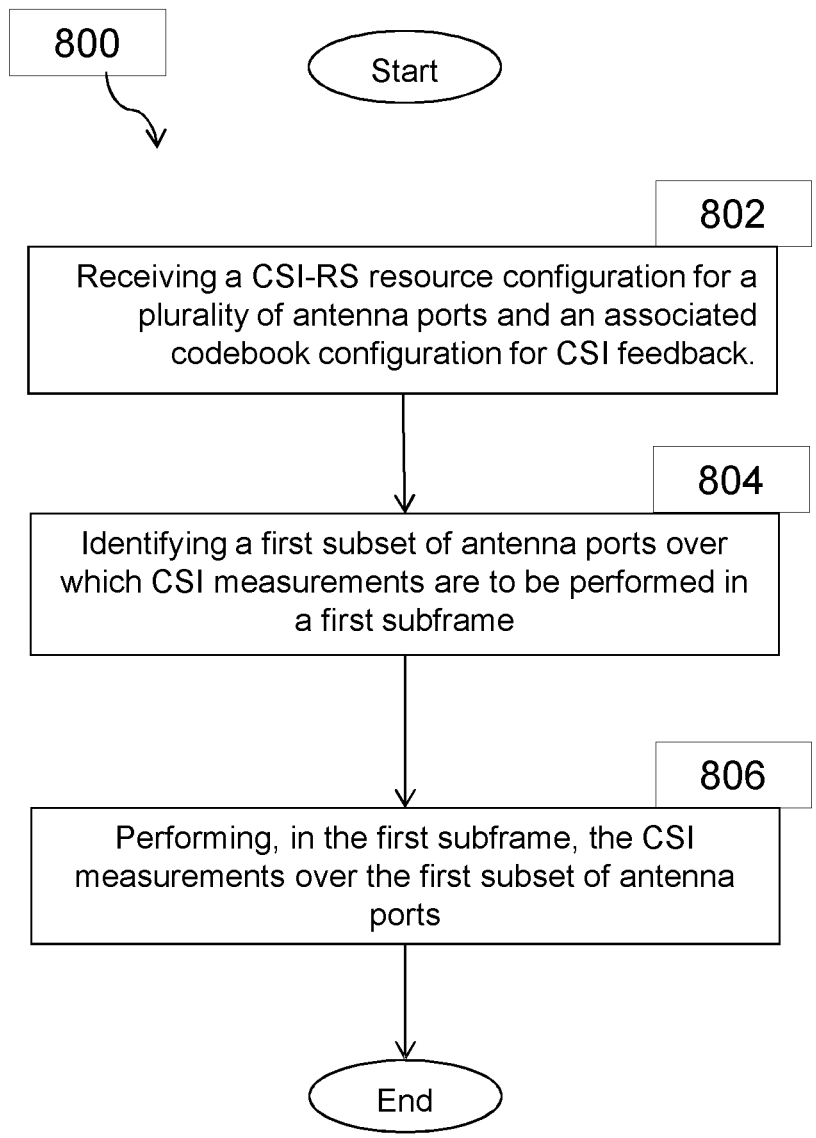
FIG. 16 illustrates another example method by a wireless device for restricting CSI measurement, according to certain embodiments.

FIG. 16 illustrates another example method 800 by a wireless device for restricting CSI measurement, according to certain embodiments. In a particular embodiment, the wireless device may include wireless device 1310 described below with respect to FIGS. 21 and 23.

The method may begin at step 802 when wireless device 1310 receives a CSI-RS resource configuration for a plurality of antenna ports and an associated codebook configuration for CSI feedback.

At step 804, the wireless device 1310 identifies a first subset of the plurality of antenna ports over which CSI measurements and feedback are to be performed in a first subframe. According to certain embodiments, the CSI feedback with the first subset of antenna ports is based on a codebook corresponding to the antenna port layout of the first subset of antenna ports. According to other embodiments, the CSI feedback with the first subset of antenna ports is based on the codebook configured for the plurality of antenna ports. According to a particular embodiment, the first subset of antenna ports may be received from a network node. The network node may include network node 1315 described below with respect to FIGS. 21 and 22. The information may be received in semi-static signaling or in dynamic signaling, according to various embodiments.

At step 806, wireless device 1310 performs CSI measurements over the first subset of antenna ports in the first subframe. Wireless device 1310 may assume that any antenna ports outside the first subset of antenna ports are muted when the codebook configured for the antenna ports is used.

According to a particular embodiment, the wireless device may also receive information identifying a second subset of antenna ports over which CSI measurements are to be performed in a second subframe. The second subset of antenna ports may include the first subset of antenna ports in certain embodiments. In such a scenario, the wireless device 1310 may additionally perform CSI measurements over the second subset of antenna ports in the second subframe.

Figure 17:
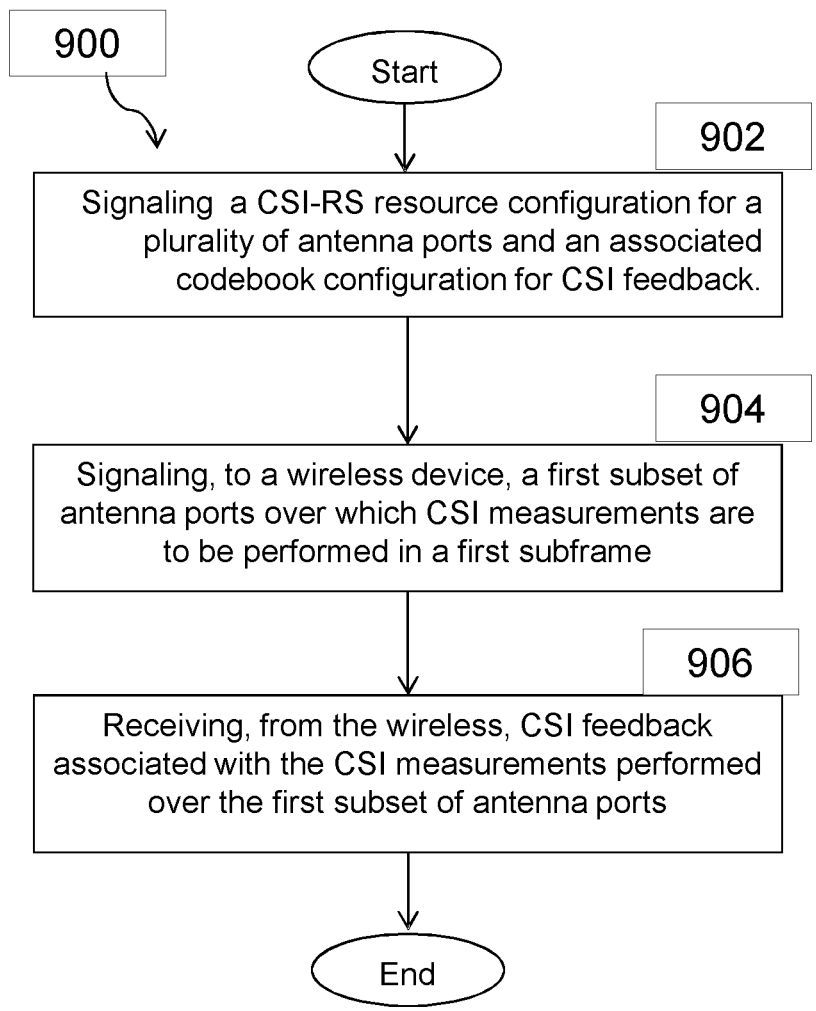
FIG. 17 illustrates another example method by a network node for restricting CSI measurement, according to certain embodiments.

FIG. 17 illustrates another example method 900 by a network node for restricting CSI measurement, according to certain embodiments. In a particular embodiment, the network node may include network node 1315 described below with respect to FIGS. 21 and 22.

The method may begin at step 902 when network node 1315 signals a CSI-RS resource configuration for a plurality of antenna ports and an associated codebook configuration for CSI feedback.

At step 904, network node 1315 signals, to a wireless device, a first subset of a plurality of antenna ports over which CSI measurements and feedback are to be performed in a first subframe. According to certain embodiments, the CSI feedback with the first subset of the plurality of antenna ports is based on a codebook corresponding to the antenna port layout of the first subset of antenna ports. According to other embodiments, the CSI feedback with the first subset of antenna ports is based on the codebook configured for the plurality of antenna ports. According to a particular embodiment, the first subset of antenna ports may be signaled to a wireless device such as wireless device 1310 described below with respect to FIGS. 21 and 22. The information may be signaled in semi-static signaling or in dynamic signaling, according to various embodiments.

At step 906, network node 1315 receives, from wireless device 1310, CSI feedback that is associated with the CSI measurements performed over the first subset of the plurality of antenna ports in the first subframe.

According to a particular embodiment, network node 1315 may also signal information identifying a second subset of the plurality of antenna ports over which CSI measurements are to be performed in a second subframe. The second subset of antenna ports may be the plurality of antenna ports in certain embodiments. In such a scenario, network node 1315 may additionally receive CSI feedback associated with the CSI measurements performed over the second subset of antenna ports in the second subframe.

Figure 18:
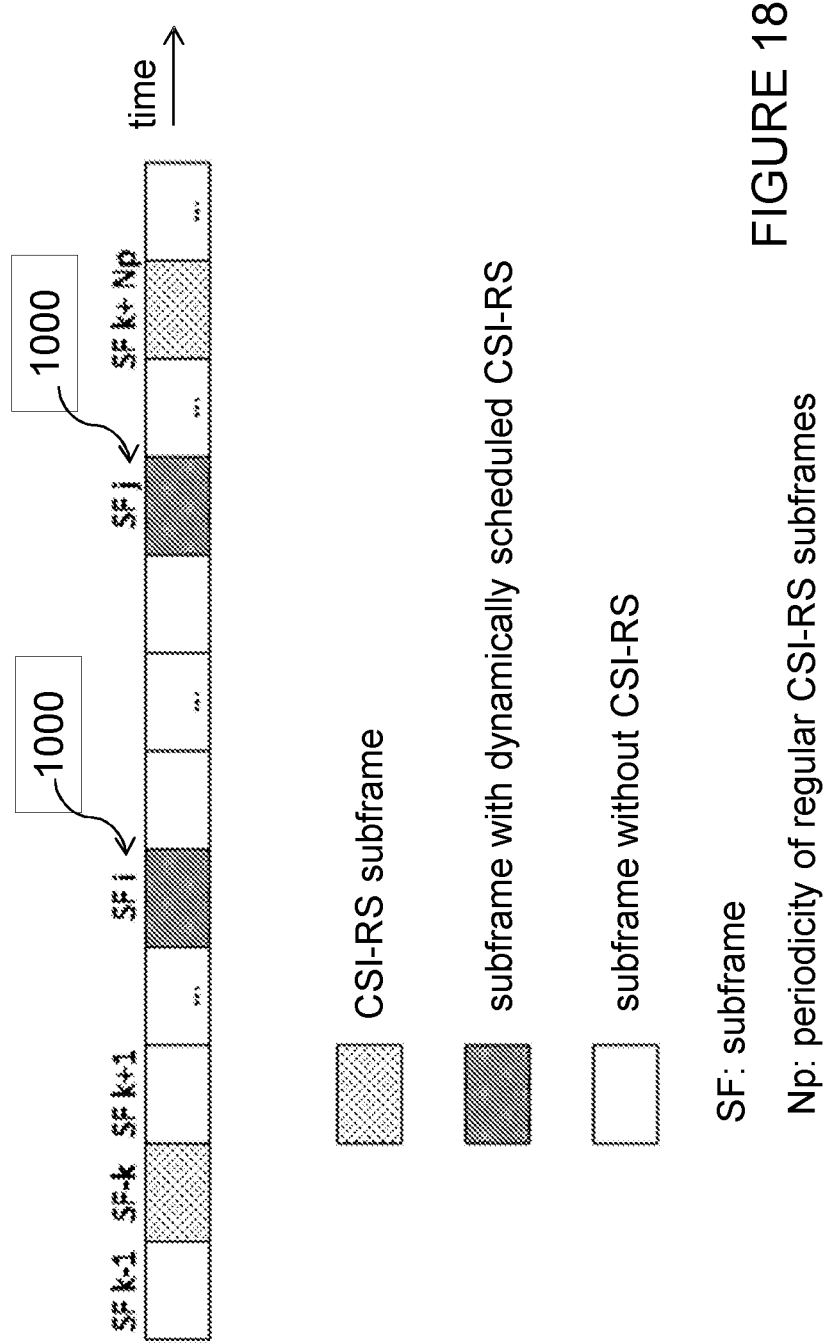
FIG. 18 illustrates an example of a scheduled CSI-RS transmission occurring in a non-regular CSI-RS subframe, in accordance with certain embodiments.

Certain embodiments may provide methods and systems for performing CSI measurements for a scheduled CSI transmission occurring in a subframe that is not configured for CSI-RS. FIG. 18 illustrates an example of a scheduled CSI-RS transmission occurring in non-regular CSI-RS subframes 1000, according to certain embodiments. Specifically, as shown, CSI-RS transmissions in subframes i and j are dynamically scheduled and are not part of the regular semi-statically configured CSI-RS subframes.

A wireless device may be dynamically signaled as to whether or not CSI-RS is present in a subframe. The dynamic signaling can be done through a downlink DCI message. In various embodiments, the DCI may be a message targeted to all wireless devices in a cell, a message targeted to a group of wireless devices, or a message targeted to each individual wireless device.

According to certain embodiments, the DCI message may contain information including CSI-RS resource configuration in the subframe. Additionally or alternatively, the DCI message may contain information including CSI-RS transmit power ratio to PDSCH. The CSI-RS information may be preconfigured semi-statically with a number of CSI-RS resource configurations, and an indicator may be included in the DCI message to indicate which CSI-RS resource configuration is used for the dynamically scheduled CSI-RS transmission.

Where the DCI is targeted to all or a group of wireless devices, the DCI may be carried on a PDCCH transmitted in the common search space with a known common Radio Network Temporary Identifier (RNTI), CSI-RS-RNTI, for all or a group of wireless devices to decode and recognize the message. According to certain embodiments, the DCI may have the same bit length as DCI format 0 in the common search space so that there is no additional search required. Only CRC (Cyclic Redundancy Code) verification with an additional RNTI, for example, CSI-RS RNTI, is needed.

Where the DCI message is targeted to individual wireless devices, only wireless devices having downlink data scheduled in the subframe or wireless devices that need to measure CSI in the subframe may be signaled. In this case, the CSI-RS indication or scheduling is included in the data scheduling message. For wireless devices having data scheduled in the subframe, the dynamic signaling indicates to the wireless devices the presence of CSI-RS and thus the wireless devices may assume that the CSI-RS REs in the subframe are not available for PDSCH transmission. As such, proper rate matching is enabled for the CSI-RS REs.

Figure 19:
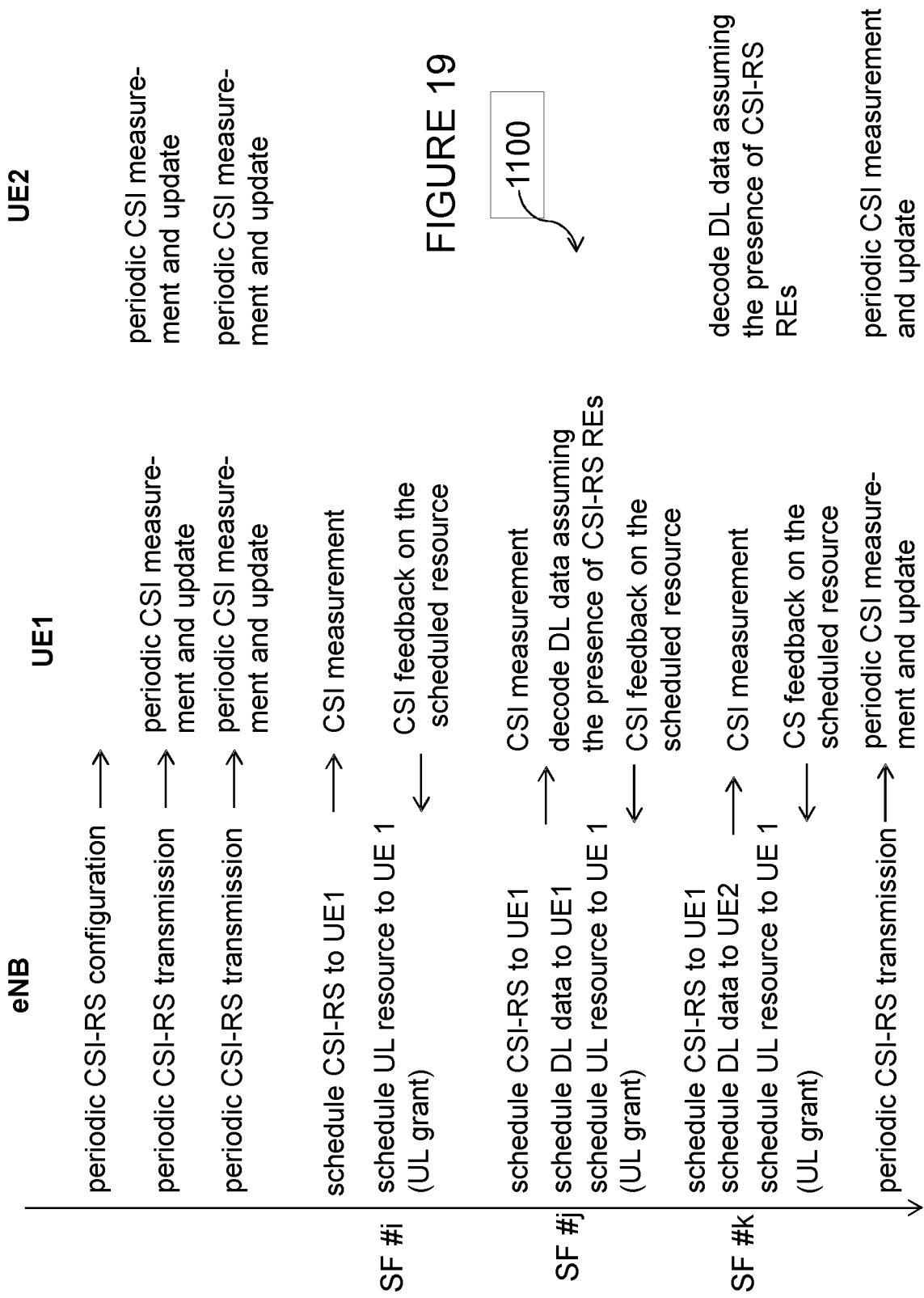
FIG. 19 illustrates an example of dynamic scheduling of CSI-RS transmission and CSI feedback with scheduling message to individual wireless devices, in accordance with certain embodiments.

FIG. 19 illustrates an example of dynamic scheduling 1100 of CSI-RS transmission and CSI feedback with scheduling message to individual wireless devices, according to certain embodiments. As depicted, CSI-RS scheduling is signaled to only a first wireless device (depicted as UE1) in subframes SF i and SF j as there is no data scheduled to a second wireless device (depicted as UE2). In Subframe SF k, both UE1 and UE2 are signaled about the presence of CSI-RS in the subframe as both have DL scheduled data.

For wireless devices required to measure CSI in the subframe and provide feedback associated with the measured CSI, each of the wireless devices may also be signaled with an uplink grant (for example using DCI formats 0 or 4) for the wireless device to report CSI in a later subframe in the uplink. In the example shown in FIG. 19, UE1 is also requested in the UL scheduling grant to measure and report CSI based on the CSI-RS in the subframe.

In certain embodiments, a wireless device requested to measure and report CSI may also be indicated in its UL grant that CSI measurement restriction in frequency domain is used. For example, the CSI may be measured on the whole system bandwidth, in a particular embodiment. Alternatively, the CSI may be measured on a subset of predefined PRBs, in a particular embodiment, or the CSI may be measured on the same PRBs over which the PDSCH is scheduled for the wireless device in the same subframe if the wireless device has DL data scheduled in the subframe, in a particular embodiment.

In addition, according to certain embodiments, a wireless device that is requested to measure and report CSI may also be indicated in the UL grant one or more of the following: CSI reporting type, e.g. Class A, or Class B; and SU-MIMO CSI or MU-MIMO CSI.

Figure 20:
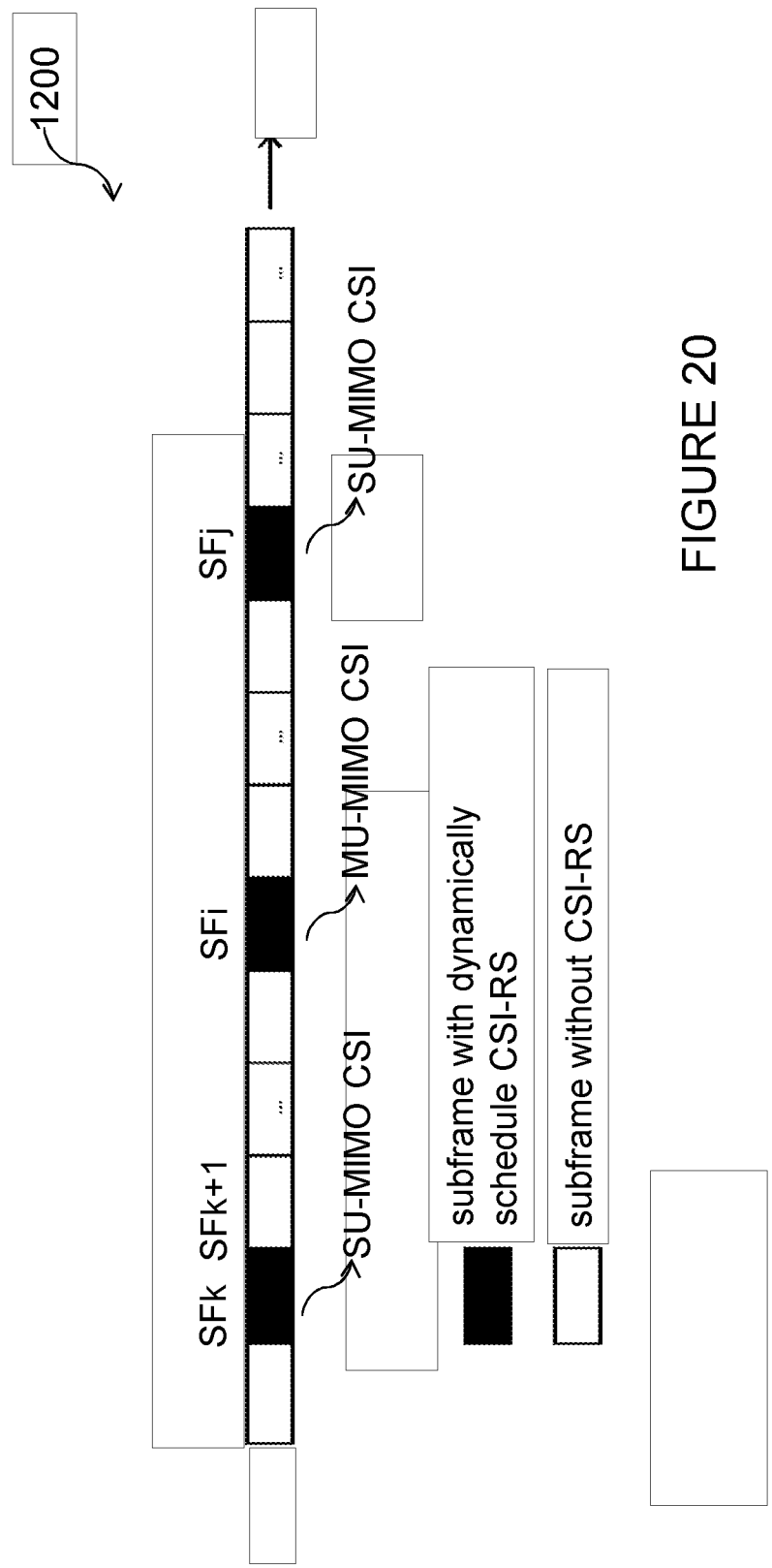
FIG. 20 illustrates an example of SU-MIMO and MU-MIMO CSI feedback with scheduled CSI-RS transmission, in accordance with certain embodiments.

FIG. 20 illustrates an example of SU-MIMO and MU-MIMO CSI feedback 1200 with scheduled CSI-RS transmission, according to certain embodiments. As depicted, CSI-RS for SU-MIMO CSI measurements are scheduled on subframe SF k and subframe SF j, while CSI-RS for MU-MIMO CSI measurement is scheduled on subframe SF i.

One of the benefits of dynamically scheduled CSI-RS is that CSI-RS does not need to be transmitted periodically all the time as in the existing LTE systems. CSI-RS may be transmitted only when the network node has downlink data to transmit to a wireless device or a group of wireless devices. This may reduce CSI-RS resource overhead and interference and save eNB power. In addition, it is more flexible and may support CSI feedback with different granularities and different reporting types.

Figure 21:
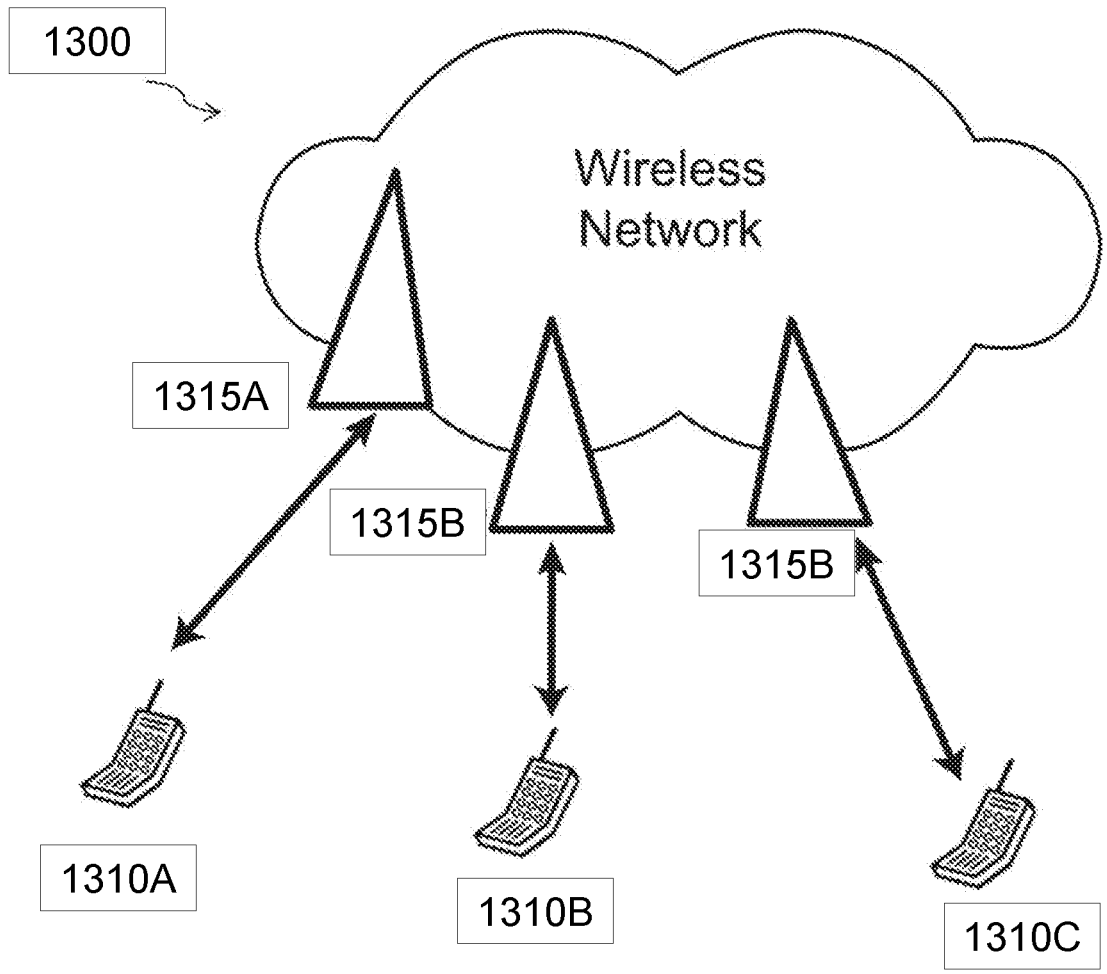
FIG. 21 illustrates an exemplary network for flexible CSI-RS transmission, in accordance with certain embodiments.

FIG. 21 is a block diagram illustrating an embodiment of a network 1300 for flexible CSI-RS transmission, in accordance with certain embodiments. Network 1300 includes one or more wireless devices 1310A-C, which may be interchangeably referred to as wireless devices 1310 or UEs 1310, and network nodes 1315A-C, which may be interchangeably referred to as network nodes 1315 or eNodeBs 1315. A wireless device 1310 may communicate with network nodes 1315 over a wireless interface. For example, wireless device 1310A may transmit wireless signals to one or more of network nodes 1315, and/or receive wireless signals from one or more of network nodes 1315. The wireless signals may contain voice traffic, data traffic, control signals, and/or any other suitable information. In some embodiments, an area of wireless signal coverage associated with a network node 1315 may be referred to as a cell. In some embodiments, wireless devices 1310 may have D2D capability. Thus, wireless devices 1310 may be able to receive signals from and/or transmit signals directly to another wireless device 1310. For example, wireless device 1310A may be able to receive signals from and/or transmit signals to wireless device 1310B.

In certain embodiments, network nodes 1315 may interface with a radio network controller (not depicted in FIG. 1). The radio network controller may control network nodes 1315 and may provide certain radio resource management functions, mobility management functions, and/or other suitable functions. In certain embodiments, the functions of the radio network controller may be included in network node 1315. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 1310. Wireless devices 1310 may exchange certain signals with the core network node using the non-access stratum layer. In non-access stratum signaling, signals between wireless devices 1310 and the core network node may be transparently passed through the radio access network. In certain embodiments, network nodes 1315 may interface with one or more network nodes over an internode interface. For example, network nodes 1315A and 1315B may interface over an X2 interface.

As described above, example embodiments of network 1300 may include one or more wireless devices 1310, and one or more different types of network nodes capable of communicating (directly or indirectly) with wireless devices 1310. Wireless device 1310 may refer to any type of wireless device communicating with a node and/or with another wireless device in a cellular or mobile communication system. Examples of wireless device 1310 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 1310 may also be referred to as UE, a station (STA), a device, or a terminal in some embodiments. Also, in some embodiments, generic terminology, "radio network node" (or simply "network node") is used. It can be any kind of network node, which may comprise a Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT, or any suitable network node. Example embodiments of network nodes 1315, wireless devices 1310, and other network nodes (such as radio network controller or core network node) are described in more detail with respect to FIGS. 22, 23, and 27, respectively.

Although FIG. 21 illustrates a particular arrangement of network 1300, the present disclosure contemplates that the various embodiments described herein may be applied to a variety of networks having any suitable configuration. For example, network 1300 may include any suitable number of wireless devices 1310 and network nodes 1315, as well as any additional elements suitable to support communication between wireless devices or between a wireless device and another communication device (such as a landline telephone). Furthermore, although certain embodiments may be described as implemented in a LTE network, the embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). For example, the various embodiments described herein may be applicable to LTE, LTE-Advanced, LTE-U UMTS, HSPA, GSM, cdma2000, WiMax, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink and vice versa.

The techniques described herein are applicable to both LAA LTE and standalone LTE operation in license-exempt channels. The described techniques are generally applicable for transmissions from both network nodes 1315 and wireless devices 1310.

Figure 22:
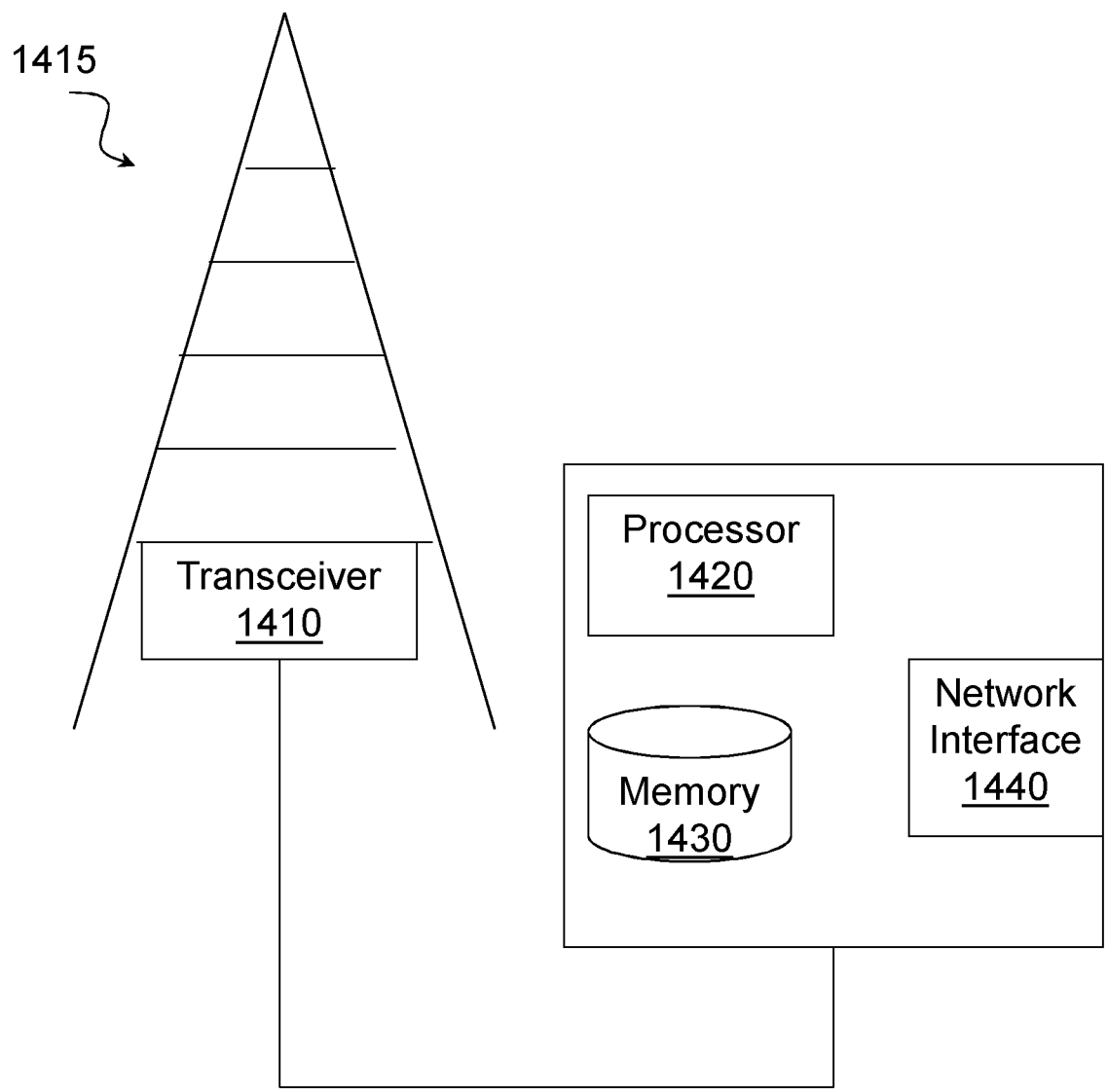
FIG. 22 illustrate an example network node for flexible CSI-RS transmission, according to certain embodiments.

FIG. 22 illustrate an example network node 1315 for flexible CSI-RS transmission, according to certain embodiments. As described above, network node 1315 may be any type of radio network node or any network node that communicates with a wireless device and/or with another network node. Examples of a network node 1315 are provided above.

Network nodes 1315 may be deployed throughout network 1300 as a homogenous deployment, heterogeneous deployment, or mixed deployment. A homogenous deployment may generally describe a deployment made up of the same (or similar) type of network nodes 1315 and/or similar coverage and cell sizes and inter-site distances. A heterogeneous deployment may generally describe deployments using a variety of types of network nodes 1315 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 1315 may include one or more of transceiver 1410, processor 1420, memory 1430, and network interface 1440. In some embodiments, transceiver 1410 facilitates transmitting wireless signals to and receiving wireless signals from wireless device 1310 (e.g., via an antenna), processor 1420 executes instructions to provide some or all of the functionality described above as being provided by a network node 1315, memory 1430 stores the instructions executed by processor 1420, and network interface 1440 communicates signals to backend network components, such as a gateway, switch, router, Internet, Public Switched Telephone Network (PSTN), core network nodes or radio network controllers, etc.

In certain embodiments, network node 1315 may be capable of using multi-antenna techniques, and may be equipped with multiple antennas and capable of supporting MIMO techniques. The one or more antennas may have controllable polarization. In other words, each element may have two co-located sub elements with different polarizations (e.g., 90-degree separation as in cross-polarization), so that different sets of beamforming weights will give the emitted wave different polarization.

Processor 1420 may include any suitable combination of hardware and software implemented in one or more modules to execute instructions and manipulate data to perform some or all of the described functions of network node 115. In some embodiments, processor 1420 may include, for example, one or more computers, one or more central processing units (CPUs), one or more microprocessors, one or more applications, processing circuitry, and/or other logic.

Memory 1430 is generally operable to store instructions, such as a computer program, software, an application including one or more of logic, rules, algorithms, code, tables, etc. and/or other instructions capable of being executed by a processor. Examples of memory 1430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1440 is communicatively coupled to processor 1420 and may refer to any suitable device operable to receive input for network node 1315, send output from network node 1315, perform suitable processing of the input or output or both, communicate to other devices, or any combination of the preceding. Network interface 1440 may include appropriate hardware (e.g., port, modem, network interface card, etc.) and software, including protocol conversion and data processing capabilities, to communicate through a network.

Other embodiments of network node 1315 may include additional components beyond those shown in FIG. 22 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components. Additionally, the terms first and second are provided for example purposes only and may be interchanged.

Figure 23:
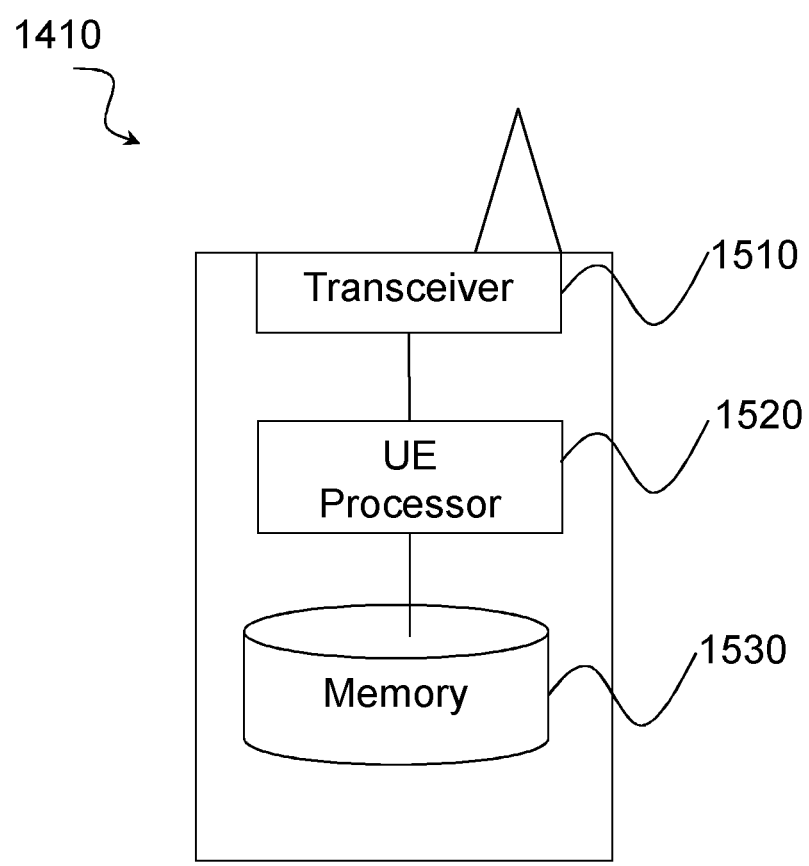
FIG. 23 illustrates an exemplary wireless device for flexible CSI-RS transmission, in accordance with certain embodiments.

FIG. 23 illustrates an example wireless device 1310 for flexible CSI-RS transmission, in accordance with certain embodiments. As depicted, wireless device 110 includes transceiver 1510, processor 1520, and memory 1530. In some embodiments, transceiver 1510 facilitates transmitting wireless signals to and receiving wireless signals from network node 1315 (e.g., via an antenna), processor 1520 executes instructions to provide some or all of the functionality described above as being provided by wireless device 1310, and memory 1530 stores the instructions executed by processor 1520. Examples of a network node 1315 are provided above.

Processor 1520 may include any suitable combination of hardware and software implemented in one or more modules to execute instructions and manipulate data to perform some or all of the described functions of wireless device 1310. In some embodiments, processor 1520 may include, for example, one or more computers, one or more central processing units (CPUs), one or more microprocessors, one or more applications, and/or other logic.

Memory 1530 is generally operable to store instructions, such as a computer program, software, an application including one or more of logic, rules, algorithms, code, tables, etc. and/or other instructions capable of being executed by a processor. Examples of memory 1530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 1310 may include additional components beyond those shown in FIG. 23 that may be responsible for providing certain aspects of the wireless device's functionality, including any of the functionality described above and/or any additional functionality (including any functionality necessary to support the solution described above).

Figure 24:
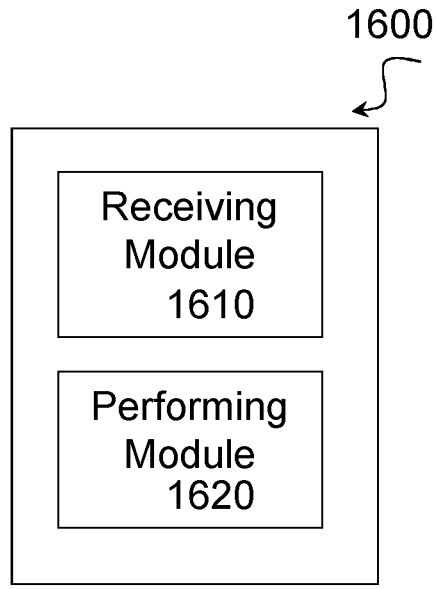
FIG. 24 illustrates an exemplary virtual computing device for flexible CSI-RS transmission, in accordance with certain embodiments.

In certain embodiments, the methods for flexible CSI-RS transmission as described above may be performed by a virtual computing device. FIG. 24 illustrates an example virtual computing device 1600 for flexible CSI-RS transmission, according to certain embodiments. In certain embodiments, virtual computing device 1600 may include modules for performing steps similar to those of method illustrated and described in FIG. 9. For example, virtual computing device 1600 may include at a receiving module 1610, a performing module 1620, and any other suitable modules for flexible CSI-RS transmission. In some embodiments, one or more of the modules may be implemented using one or more processors 1520 of FIG. 23. In certain embodiments, the functions of two or more of the various modules may be combined into a single module.

The receiving module 1610 may perform the receiving functions of virtual computing device 1600. For example, in a particular embodiment, receiving module 1610 may receive, from network node 1315, information identifying a first subset of CSI-RS resources to be used in performing CSI measurements. The first subset of CSI-RS may be associated with a first portion of a frequency band that is less than all of the frequency band.

The performing module 1620 may perform the performing functions of virtual computing device 1600. For example, in a particular embodiment, performing module 1620 may perform CSI measurements in the first subset of CSI-RS resources being associated with the first portion of the frequency band.

Other embodiments of virtual computing device 1600 may include additional components beyond those shown in FIG. 24 that may be responsible for providing certain aspects of the wireless device's 1310 functionality, including any of the functionality described above and/or any additional functionality (including any functionality necessary to support the solutions described above). The various different types of wireless devices 1310 may include components having the same physical hardware but configured (e.g., via programming) to support different radio access technologies, or may represent partly or entirely different physical components.

Figure 25:
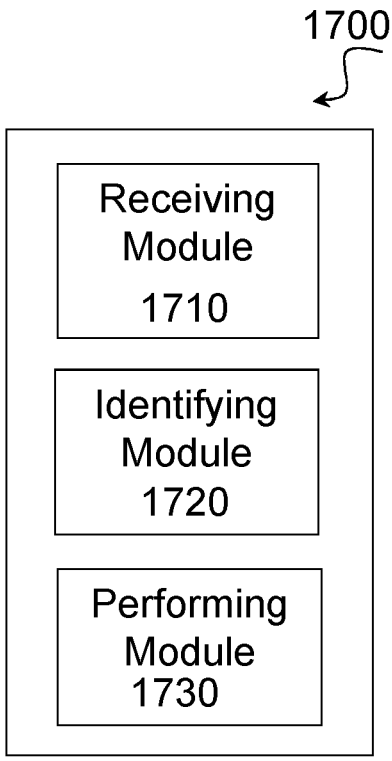
FIG. 25 illustrates another exemplary virtual computing device for flexible channel state information-reference signal transmission, in accordance with certain embodiments.

FIG. 25 illustrates another example virtual computing device 1700 for flexible CSI-RS transmission, according to certain embodiments. In certain embodiments, virtual computing device 1700 may include modules for performing steps similar to those of method illustrated and described in FIG. 16. For example, virtual computing device 1700 may include at an receiving module 1710, a identifying module 1720, performing module 1730, and any other suitable modules for flexible CSI-RS transmission. In some embodiments, one or more of the modules may be implemented using one or more processors 1520 of FIG. 23. In certain embodiments, the functions of two or more of the various modules may be combined into a single module.

The receiving module 1710 may perform the receiving functions of virtual computing device 1700. For example, in a particular embodiment, receiving module 1710 may receive a CSI-RS resource configuration for a plurality of antenna ports and an associated codebook configuration for CSI feedback.

The identifying module 1720 may perform the identifying functions of virtual computing device 1700. For example, in a particular embodiment, identifying module 1720 may identify a first subset of antenna ports over which CSI measurements are to be performed in a first subframe.

The performing module 1730 may perform the performing functions of virtual computing device 1700. For example, in a particular embodiment, performing module 1730 may perform CSI measurements over the first subset of antenna ports in the first subframe.

Other embodiments of virtual computing device 1700 may include additional components beyond those shown in FIG. 25 that may be responsible for providing certain aspects of the wireless device's 1310 functionality, including any of the functionality described above and/or any additional functionality (including any functionality necessary to support the solutions described above). The various different types of wireless devices 1310 may include components having the same physical hardware but configured (e.g., via programming) to support different radio access technologies, or may represent partly or entirely different physical components.

Figure 26:
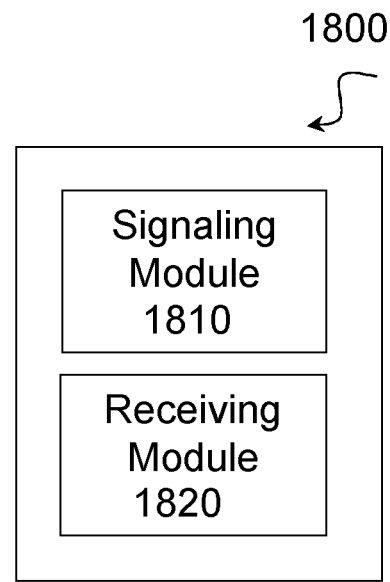
FIG. 26 illustrates yet another exemplary virtual computing device for flexible CSI-RS transmission, in accordance with certain embodiments.

FIG. 26 illustrates yet another example virtual computing device 1800 for flexible CSI-RS transmission, according to certain embodiments. In certain embodiments, virtual computing device 1800 may include modules for performing steps similar to those of method illustrated and described in FIG. 14. For example, virtual computing device 1800 may include at a signaling module 1810, a receiving module 1820, and any other suitable modules for flexible CSI-RS transmission. In some embodiments, one or more of the modules may be implemented using one or more processors 1420 of FIG. 22. In certain embodiments, the functions of two or more of the various modules may be combined into a single module.

The signaling module 1810 may perform the signaling functions of virtual computing device 1800. For example, in a particular embodiment, signaling module 1810 may signal, to a wireless device 1310, information identifying a first subset of CSI-RS resources to be used in performing CSI measurements. The first subset of CSI-RS resources may be associated with a first portion of a frequency band that is less than all of the frequency band. As another example, in a particular embodiment, signaling module 1810 may signal, to wireless device 1310, a first subset of antenna ports over which CSI measurements are to be performed in a first subframe.

The receiving module 1820 may perform the receiving functions of virtual computing device 1800. For example, in a particular embodiment, receiving module 1820 may receive, from the wireless device 1310, CSI feedback associated with the CSI measurements performed using the first subset of CSI-RS resources. As another example, in a particular embodiment, receiving module 1820 may receive, from wireless device 1310, CSI feedback associated with the CSI measurements performed over the first subset of antenna ports.

Other embodiments of virtual computing device 1800 may include additional components beyond those shown in FIG. 26 that may be responsible for providing certain aspects of the network node's 1315 functionality, including any of the functionality described above and/or any additional functionality (including any functionality necessary to support the solutions described above). The various different types of network nodes 1315 may include components having the same physical hardware but configured (e.g., via programming) to support different radio access technologies, or may represent partly or entirely different physical components.

Figure 27:
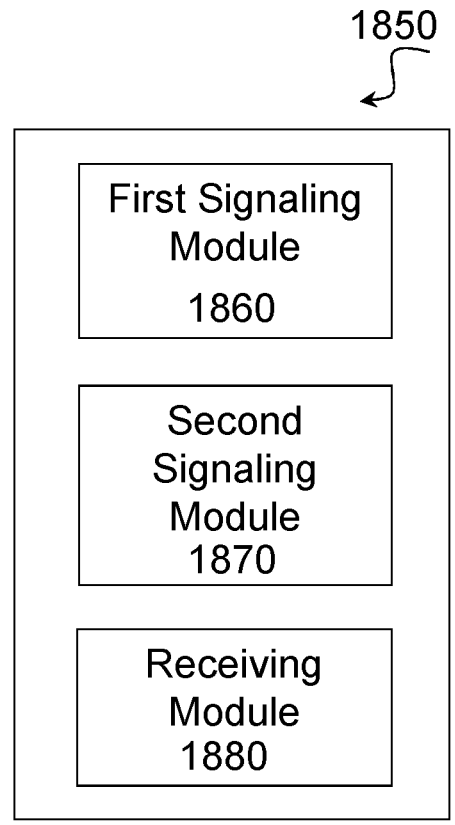
FIG. 27 illustrates yet another exemplary virtual computing device for flexible CSI-RS transmission, in accordance with certain embodiments.

FIG. 27 illustrates another example virtual computing device 1850 for flexible CSI-RS transmission, according to certain embodiments. In certain embodiments, virtual computing device 1850 may include modules for performing steps similar to those of method illustrated and described in FIG. 17. For example, virtual computing device 1850 may include at a first signaling module 1860, a second signaling module 1870, a receiving module 1880, and any other suitable modules for flexible CSI-RS transmission. In some embodiments, one or more of the modules may be implemented using one or more processors 1420 of FIG. 22. In certain embodiments, the functions of two or more of the various modules may be combined into a single module.

The first signaling module 1860 may perform certain of the signaling functions of virtual computing device 1850. For example, in a particular embodiment, first signaling module 1860 may signal a CSI-RS resource configuration for a plurality of antenna ports and an associated codebook configuration for CSI feedback. The second signaling module 1870 may perform certain other of the signaling functions of virtual computing device 1850. For example, in a particular embodiment, second signaling module 1870 may signal, to a wireless device, a first subset of antenna ports over which CSI measurements are to be performed in a first subframe.

The receiving module 1880 may perform the receiving functions of virtual computing device 1850. For example, in a particular embodiment, receiving module 1880 may receive, from the wireless, CSI feedback associated with the CSI measurements performed over the first subset of antenna port.

Other embodiments of virtual computing device 1850 may include additional components beyond those shown in FIG. 27 that may be responsible for providing certain aspects of the network node 1315's functionality, including any of the functionality described above and/or any additional functionality (including any functionality necessary to support the solutions described above). The various different types of network nodes 1315 may include components having the same physical hardware but configured (e.g., via programming) to support different radio access technologies, or may represent partly or entirely different physical components.

Figure 28:
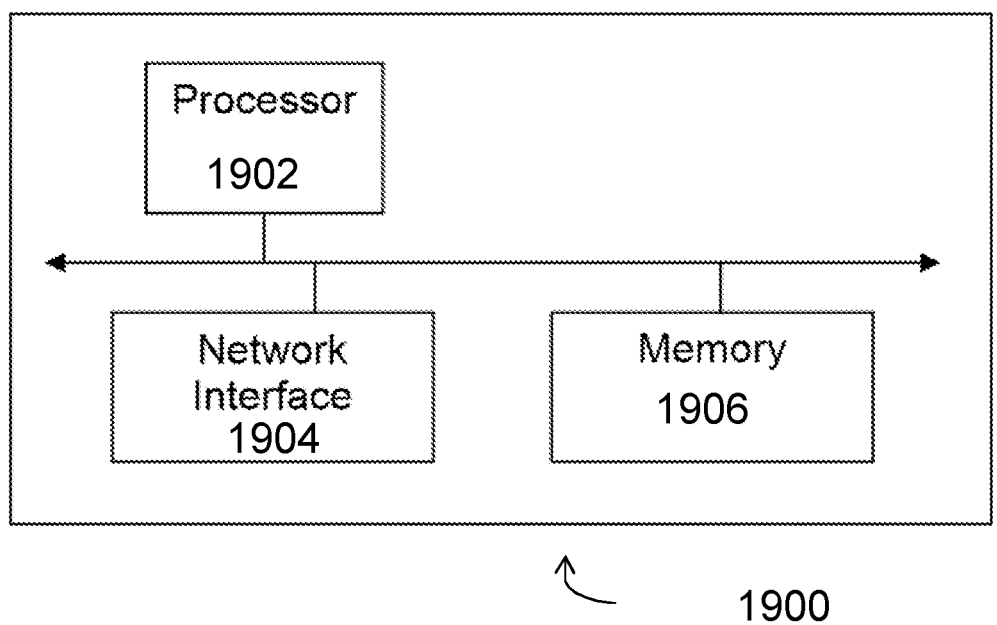
FIG. 28 illustrates an exemplary radio network controller or core network node for flexible CSI-RS transmission, in accordance with certain embodiments.

FIG. 28 illustrates an exemplary radio network controller or core network node, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 1900 includes processor 1920, memory 1930, and network interface 1940. In some embodiments, processor 1920 executes instructions to provide some or all of the functionality described above as being provided by the network node, memory 1930 stores the instructions executed by processor 1920, and network interface 1940 communicates signals to any suitable node, such as a gateway, switch, router, Internet, Public Switched Telephone Network (PSTN), network nodes 1315, radio network controllers or core network nodes 1900, etc.

Processor 1920 may include any suitable combination of hardware and software implemented in one or more modules to execute instructions and manipulate data to perform some or all of the described functions of the radio network controller or core network node 1900. In some embodiments, processor 1920 may include, for example, one or more computers, one or more central processing units (CPUs), one or more microprocessors, one or more applications, and/or other logic.

Memory 1930 is generally operable to store instructions, such as a computer program, software, an application including one or more of logic, rules, algorithms, code, tables, etc. and/or other instructions capable of being executed by a processor. Examples of memory 1930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1940 is communicatively coupled to processor 1920 and may refer to any suitable device operable to receive input for the network node, send output from the network node, perform suitable processing of the input or output or both, communicate to other devices, or any combination of the preceding. Network interface 1940 may include appropriate hardware (e.g., port, modem, network interface card, etc.) and software, including protocol conversion and data processing capabilities, to communicate through a network.

Other embodiments of the network node may include additional components beyond those shown in FIG. 28 that may be responsible for providing certain aspects of the network node's functionality, including any of the functionality described above and/or any additional functionality (including any functionality necessary to support the solution described above).

According to certain embodiments, a method is provided for restricting CSI measurement on CSI-RS in a subset of PRBs in the frequency domain in order to support more NZP CSI-RS antenna ports in closed-loop MIMO transmissions. The method includes:
   splitting NZP CSI-RS resources into subsets;
   signaling to a UE information identifying which CSI-RS resource subsets the UE may use to determine CSI feedback; and
   associating different subsets of an NZP CSI-RS resource with different CSI processes, with different CSI reporting types (such as Type A and Type B CSI reporting), and/or different number of antenna ports.

Optionally, in embodiments where the subsets of PRBs are LTE subbands, for subbands excluded in CSI reporting, subband PMI and CQI values are either not reported or are set to fixed, specified values.

According to certain embodiments, a network node is provided for restricting CSI measurement on CSI-RS in a subset of PRBs in the frequency domain in order to support more NZP CSI-RS antenna ports in closed-loop MIMO transmissions. The network node includes a processor operable to:
   split NZP CSI-RS resources into subset;
   signal a UE with information identifying which CSI-RS resource subsets the UE may use to calculate CSI feedback; and
   associate different subsets of an NZP CSI-RS resource with different CSI processes, with different CSI reporting types (such as Type A and Type B CSI reporting), and/or different number of antenna ports.

Optionally, in embodiments where the subsets of PRBs are LTE subbands, for subbands excluded in CSI reporting, subband PMI and CQI values are either not reported or are set to fixed, specified values.

According to certain embodiments, a method is provided for restricting CSI measurement on CSI-RS in a subset of PRBs in the frequency domain in order to support more NZP CSI-RS antenna ports in closed-loop MIMO transmissions. The method includes:

signaling a UE to measure channels from a serving cell using REs containing CSI-RS in even-numbered PRBs or in odd number PRBs in a CSI-RS subframe.

Optionally, the subset of PRBs is semi-statically configured for the UE as part of CSI measurement restriction.

Optionally, the UE is signaled to measure the channels in only the even-numbered PRBs and the UE operates to measure in only the CSI-RS transmitted in the even-numbered PRBs.

Optionally, the UE is signaled to measure the channels in only the odd-numbered PRBs and the UE operates to measure only the CSI-RS transmitted in the odd-numbered PRBs.

Optionally, two groups of UEs may have the same CSI-RS resource configuration.

Optionally, two groups of UEs may have the same number of CSI-RS ports and the same CSI-RS REs in the subframe.

Optionally, two groups of UEs have different number of CSI-RS ports.

Optionally, the UEs in a group with smaller number of CSI-RS ports are configured with additional zero-power CSI-RS on REs that are configured for CSI-RS for the other group.

Optionally, UEs in a Group A and UEs in a Group B may be associated with different cells.

Optionally, a UE is configured with a CSI process A and a CSI process B, wherein the UE is configured to measure CSI for CSI process A in one set of PRBs and measure CSI for CSI process B in another set of PRBs.

Optionally, a UE may be configured with a Class A type of CSI reports and a Class B type of CSI reports, wherein the UE is configured to measure CSI for Class A type of reporting on one set of PRBs and measure CSI for Class B type of reporting on another set of PRBs.

Optionally, a UE may be configured with a Class A type of CSI reports and a Class B type of CSI reports, wherein the UE is configured to measure CSI for Class A type of reporting on even PRBs and measure CSI for Class B type of reporting on another set of PRBs.

Optionally, a UE may be configured by dynamic signaling to indicate whether a Class A or Class B type of CSI should be reported.

Optionally, a UE may be configured to measure channels on a subset of the configured antenna ports on one set of PRBs and another set of antenna ports on a different set of PRBs.

Optionally, a UE may be configured such that antenna ports 0 to 15 (Group A) are allocated to PRB 0 and antenna ports 16 to 30 (Group B) are allocated to PRB 1.

Optionally, the measurement restriction may be applied to every M (M>1) PRBs, wherein the UE is configured to measure CSI over alternating blocks of 2 adjacent PRBs, wherein a UE belonging to group A is configured to measure CSI in PRBs 0, 1, 4, 5, . . . , N−4, N−3 and a UE belonging to group B is configured to measure CSI in PRBs 2, 3, 6, 7, . . . , N−2, N−1.

Optionally, the measurement restriction is applied to the precoding resource block groups (PRGs), wherein the UE is restricted to measure only a subset of PRGs.

Optionally, the UE is configured for subband CQI reporting and CSI-RS measurement restriction.

Optionally, the UE is configured for subband CQI reporting and CSI-RS measurement restriction and the UE may not assume that CSI-RS are present in more than one subband.

According to certain embodiments, a network node is provided for restricting CSI measurement on CSI-RS in a subset of PRBs in the frequency domain in order to support more NZP CSI-RS antenna ports in closed-loop MIMO transmissions. The network node comprises a processor configured to:

signal a UE to measure channels from a serving cell using REs containing CSI-RS in even-numbered PRBs or in odd number PRBs in a CSI-RS subframe.

Optionally, the subset of PRBs is semi-statically configured for the UE as part of CSI measurement restriction.

Optionally, the UE is signaled to measure the channels in only the even-numbered PRBs and the UE operates to measure in only the CSI-RS transmitted in the even-numbered PRBs.

Optionally, the UE is signaled to measure the channels in only the odd-numbered PRBs and the UE operates to measure only the CSI-RS transmitted in the odd-numbered PRBs.

Optionally, two groups of UEs may have the same CSI-RS resource configuration.

Optionally, two groups of UEs may have the same number of CSI-RS ports and the same CSI-RS REs in the subframe.

Optionally, two groups of UEs have different number of CSI-RS ports.

Optionally, the UEs in a group with smaller number of CSI-RS ports are configured with additional zero-power CSI-RS on REs that are configured for CSI-RS for the other group.

Optionally, UEs in a Group A and UEs in a Group B may be associated with different cells.

Optionally, a UE is configured with a CSI process A and a CSI process B, wherein the UE is configured to measure CSI for CSI process A in one set of PRBs and measure CSI for CSI process B in another set of PRBs.

Optionally, a UE may be configured with a Class A type of CSI reports and a Class B type of CSI reports, wherein the UE is configured to measure CSI for Class A type of reporting on one set of PRBs and measure CSI for Class B type of reporting on another set of PRBs.

Optionally, a UE may be configured with a Class A type of CSI reports and a Class B type of CSI reports, wherein the UE is configured to measure CSI for Class A type of reporting on even PRBs and measure CSI for Class B type of reporting on another set of PRBs.

Optionally, a UE may be configured by dynamic signaling to indicate whether a Class A or Class B type of CSI should be reported.

Optionally, a UE may be configured to measure channels on a subset of the configured antenna ports on one set of PRBs and another set of antenna ports on a different set of PRBs.

Optionally, a UE may be configured such that antenna ports 0 to 15 (Group A) are allocated to PRB 0 and antenna ports 16 to 30 (Group B) are allocated to PRB 1.

Optionally, the measurement restriction may be applied to every M (M>1) PRBs, wherein the UE is configured to measure CSI over alternating blocks of 2 adjacent PRBs, wherein a UE belonging to group A is configured to measure CSI in PRBs 0, 1, 4, 5, . . . , N−4, N−3 and a UE belonging to group B is configured to measure CSI in PRBs 2, 3, 6, 7, . . . , N−2, N−1.

Optionally, the measurement restriction is applied to the precoding resource block groups (PRGs), wherein the UE is restricted to measure only a subset of PRGs.

Optionally, the UE is configured for subband CQI reporting and CSI-RS measurement restriction.

Optionally, the UE is configured for subband CQI reporting and CSI-RS measurement restriction and the UE may not assume that CSI-RS are present in more than one subband.

According to certain embodiments, a method is provided for restricting CSI measurement to a subset of antenna ports. The method includes:
  preconfiguring the restriction semi-statically on certain CSI-RS subframes; or
  dynamically signaling the restriction through at least one uplink grant.

According to certain embodiments, a network node is provided for restricting CSI measurement to a subset of antenna ports. The network node includes a processor which is operable to:
  preconfigure the restriction semi-statically on certain CSI-RS subframes; or
  dynamically signal the restriction through an uplink grant.

According to certain embodiments, a method is provided for restricting CSI measurement to a subset of antenna ports. The method includes:
  configure a UE to measure CSI over a full set of configured antenna ports in some CSI-RS subframes; and
  configure the UE to measure CSI over a subset of the antenna ports in some other subframes.

Optionally, the UE may be configured with two CSI-RS subframe configurations, wherein each of the two CSI-RS subframe configurations have a different number of antenna ports.

Optionally, the UE may be configured to perform CSI measurements on 8 out of 32 antenna ports in some CSI-RS subframes and to perform CSI measurements on all 32 ports in other subframes.

Optionally, the subframes over which CSI for a subset of antenna ports is measured can be semi-statically configured.

Optionally, a UE may be configured to measure CSI based on only a subset of 32 antenna ports in some subframes.

Optionally, the subset of antenna ports can be preconfigured in the UE.

Optionally, the request for CSI measurement on a subset of antenna ports may be dynamically indicated or signaled in an uplink scheduling grant.

Optionally, the CSI feedback for the subset of the antenna ports is based on either a codebook or the subset of antenna ports (e.g., 8 antenna ports or a codebook of full antenna ports (i.e., 32 antenna ports).

Optionally, the UE is configured to assume that the ports other than the subset of antenna ports configured for CSI feedback are muted.

According to certain embodiments, a method is provided for dynamically scheduling CSI-RS transmissions and feedback. The method includes:
  using a downlink control information (DCI) to schedule CSI-RS transmissions and feedback, the DCI signaled either to
    all UEs or a group of UEs, wherein, a single DCI message is transmitted over a common control channel search space; or
    individual UEs, wherein individual DCI messages are sent to UEs having data scheduled in the subframe or UEs required to measure and report back CSI;
  scheduling CSI-RS with different CSI-RS resource configurations in different subframes, wherein the CSI-RS configuration is indicated in a scheduling DCI message(s); and
  signaling UEs required to measure and report CSI with an UL grant using DCI 0 or DCI 4 that is sent in the same subframe as the scheduled CSI-RS, wherein the CSI reporting type is also indicated in the UL grant.

According to certain embodiments, a network node is provided for dynamically scheduling CSI-RS transmissions and feedback. The network node includes a processor operable to:
  use a downlink control information (DCI) to schedule CSI-RS transmissions and feedback, the DCI signaled either to
    all UEs or a group of UEs, wherein, a single DCI message is transmitted over a common control channel search space; or
    individual UEs, wherein individual DCI messages are sent to UEs having data scheduled in the subframe or UEs required to measure and report back CSI;
  schedule CSI-RS with different CSI-RS resource configurations in different subframes, wherein the CSI-RS configuration is indicated in a scheduling DCI message(s); and
  signal UEs required to measure and report CSI with an UL grant using DCI 0 or DCI 4 that is sent in the same subframe as the scheduled CSI-RS, wherein the CSI reporting type is also indicated in the UL grant.

According to certain embodiments, a method is provided for dynamically scheduling CSI-RS transmissions and feedback. The method includes:

configure a UE for CSI-RS transmission in a non-regular CSI-RS subframe;

Optionally, the non-regular CSI-RS subframes are dynamically scheduled and not part of the regular semi-statically configured CSI-RS subframes.

Optionally, the UE is dynamically signaled as to whether or not CSI-RS is present in a subframe.

Optionally, the UE is dynamically signaled as to whether or not CSI-RS is present in a subframe via a DCI message, wherein the DCI message comprises CSI-RS resource configuration in the subframe and/or CSI-RS transmit power ratio to PDSCH.

Optionally, a UE is preconfigured semi-statically with a number of CSI-RS resource configurations, wherein an indicator is included in a DCI message to indicate which CSI-RS resource configuration is used for the dynamically scheduled CSI-RS transmission.

Optionally, the DCI is targeted to all or a group of UEs.

Optionally, the DCI is targeted to individual UEs, wherein only a UE having downlink data scheduled in the subframe or UEs that need to measure CSI in the subframe are signaled.

Optionally, the CSI-RS indication is included in the data scheduling message.

Optionally, the CSI-RS indication indicates the presence of CSI-RS and the UE is configured to assume that the CSI-RS REs in the subframe are not available for PDSCH transmission.

Optionally, the UE is configured to measure CSI in the subframe and feedback the measured CSI, wherein the UE is signaled with an uplink grant to report CSI in a later subframe in the uplink.

According to certain embodiments, a network node is provided for dynamically scheduling CSI-RS transmissions and feedback. The network node includes a processor is configured to:

configure a UE for CSI-RS transmission in a non-regular CSI-RS subframe.

Optionally, the non-regular CSI-RS subframes are dynamically scheduled and not part of the regular semi-statically configured CSI-RS subframes.

Optionally, the UE is dynamically signaled as to whether or not CSI-RS is present in a subframe.

Optionally, the UE is dynamically signaled as to whether or not CSI-RS is present in a subframe via a DCI message, wherein the DCI message comprises CSI-RS resource configuration in the subframe and/or CSI-RS transmit power ratio to PDSCH.

Optionally, a UE is preconfigured semi-statically with a number of CSI-RS resource configurations, wherein an indicator is included in a DCI message to indicate which CSI-RS resource configuration is used for the dynamically scheduled CSI-RS transmission.

Optionally, the DCI is targeted to all or a group of UEs.

Optionally, the DCI is targeted to individual UEs, wherein only a UE having downlink data scheduled in the subframe or UEs that need to measure CSI in the subframe are signaled.

Optionally, the CSI-RS indication is included in the data scheduling message.

Optionally, the CSI-RS indication indicates the presence of CSI-RS and the UE is configured to assume that the CSI-RS REs in the subframe are not available for PDSCH transmission.

Optionally, the UE is configured to measure CSI in the subframe and feedback the measured CSI, wherein the UE is signaled with an uplink grant to report CSI in a later subframe in the uplink.

Certain embodiments of the present disclosure may provide one or more technical advantages. For example, certain embodiments may provide reduced CSI-RS resource overhead and potential to support a large number of antennas. Another advantage may be that certain embodiments provide flexible CSI-RS transmission and CSI measurement. Still another advantage may be that CSI-RS transmission may be adapted to the number of UEs in a cell and different UE mobilities. Another advantage still may be that techniques may provide different CSI feedback granularity to support SU-MIMO and MU-MIMO feedbacks.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method by a wireless device for restricting channel state information, CSI, measurement comprises:
    receiving, from a network node, information identifying a first subset of channel state information-reference signal, CSI-RS, resources comprising one or more parameters identifying a first subset of physical resource blocks (PRBs) and a first subset of antenna ports to be used in performing CSI measurements, the first subset of antenna ports being associated with a first portion of a frequency band that is less than all of the frequency band, wherein the information received from the network node further identifies a first CSI reporting type of a plurality of CSI reporting types for reporting the CSI associated with the first subset of CSI-RS resources;
    performing CSI measurements in the first subset of antenna ports being associated with the first portion of the frequency band; and
    based on the information, preparing a first CSI report of the first CSI reporting type of the plurality of CSI reporting types, the first CSI report comprising one or more values associated with the CSI measurements performed in the first subset of CSI-RS resources.

2. The method of claim 1, wherein the frequency band comprises a system bandwidth in a CSI-RS subframe.

3. The method of claim 1, further comprising:
    transmitting, to the network node, the first CSI report comprising the one or more values associated with the CSI measurements performed in the first subset of CSI-RS resources.

4. The method of claim 1, wherein the frequency band consists of a plurality of physical resource blocks (PRBs).

5. The method of claim 1, wherein a first portion of the frequency band consists of the first subset of PRBs in the frequency band.

6. The method of claim 1, wherein the first subset of CSI-RS resources comprises CSI-RS resources in the first subset of PRBs.

7. The method of claim 1, wherein:
the first subset of PRBs comprises a set of even number PRBs or a set of odd number PRBs in the frequency band, and
based on the information received from the network node, performing the CSI measurements comprises performing the CSI-measurements on the first subset of CSI-RS resources configured on the set of even number PRBs or the set of odd number PRBs.

8. The method of claim 1, wherein the first subset of PRBs comprises every M PRBs in the frequency band, and wherein M is an integer and is greater than one.

9. The method of claim 1, wherein the information identifying the first subset of CSI-RS resources is received in semi-static signaling.

10. The method of claim 1, wherein the information identifying the first subset of CSI-RS resources is received in dynamic signaling.

11. The method of claim 10, wherein the information is received as downlink control information, DCI, and wherein the DCI is received in a common control channel search space or UE specific search space.

12. The method of claim 1, further comprising:
receiving, from the network node, information identifying a second subset of CSI-RS resources to be used in performing CSI measurements, the second subset of CSI-RS resources being associated with a second portion of the frequency band that is less than all of the frequency band and different from the first portion; and
performing the CSI measurements in the second subset of CSI-RS resources being associated with the second portion of the frequency band.

13. The method of claim 12, wherein:
the information identifying the second subset of CSI-RS resources is associated with a second CSI reporting type of the plurality of CSI reporting types, and
the method further comprises:
based on the information, preparing a second CSI report of the second CSI reporting type of the plurality of CSI reporting types, the second CSI report comprising one or more values associated with the CSI measurements performed in the second subset of CSI-RS resources.

14. The method of claim 1, wherein:
the information identifying the first subset of CSI-RS resources comprises a subset of precoding resource block groups, PRGs.

15. A wireless device for restricting channel state information, CSI, measurement, comprising:
processing circuitry, the processing circuitry configured to:
receive, from a network node, information identifying a first subset of channel state information reference-signal, CSI-RS, resources comprising one or more parameters identifying a first subset of physical resource blocks (PRBs) and a first subset of antenna ports to be used in performing CSI measurements, the first subset of antenna ports being associated with a first portion of a frequency band that is less than all of the frequency band, wherein the information received from the network node further identifies a first CSI reporting type of a plurality of CSI reporting types for reporting the CSI associated with the first subset of CSI-RS resources;
perform CSI measurements in the first subset of antenna ports being associated with the first portion of the frequency band; and
based on the information, prepare a first CSI report of the first CSI reporting type of the plurality of CSI reporting types, the first CSI report comprising one or more values associated with the CSI measurements performed in the first subset of CSI-RS resources.

16. A method by a network node for restricting channel state information, CSI, measurement comprises:
signaling, to a first wireless device, information identifying a first subset of channel state information-reference signal, CSI-RS, resources comprising one or more parameters identifying a first subset of physical resource blocks (PRBs) and a first subset of antenna ports to be used in performing CSI measurements, the first subset of antenna ports being associated with a first portion of a frequency band, the first portion being less than all of the frequency band, wherein the information received from the network node further identifies a first CSI reporting type of a plurality of CSI reporting types for reporting the CSI associated with the first subset of CSI-RS resources; and
receiving, from the first wireless device, a first CSI report of the first CSI reporting type, the first CSI report comprising one or more values associated with the CSI measurements performed using the first subset of CSI-RS resources.

* * * * *